United States Patent
Pendergrass et al.

(10) Patent No.: US 7,477,910 B2
(45) Date of Patent: Jan. 13, 2009

(54) METHOD AND SYSTEM OF PICONET GROUPS

(75) Inventors: Marcus H. Pendergrass, Huntsville, AL (US); Vernon R. Brethour, Owen Crossroads, AL (US)

(73) Assignee: Alereon, Inc., Austin, TX (US)

( * ) Notice: Subject to any disclaimer, the term of this patent is extended or adjusted under 35 U.S.C. 154(b) by 0 days.

(21) Appl. No.: 11/708,822

(22) Filed: Feb. 21, 2007

(65) Prior Publication Data

US 2007/0155330 A1 Jul. 5, 2007

Related U.S. Application Data

(63) Continuation of application No. 10/688,796, filed on Oct. 17, 2003.

(60) Provisional application No. 60/451,560, filed on Mar. 3, 2003, provisional application No. 60/432,435, filed on Dec. 11, 2002, provisional application No. 60/424,642, filed on Nov. 7, 2002, provisional application No. 60/419,459, filed on Oct. 17, 2002.

(51) Int. Cl.
*H04B 7/00* (2006.01)
*H04B 15/00* (2006.01)

(52) U.S. Cl. ............... 455/502; 455/507; 455/509; 455/515; 455/63.1; 455/41.2; 370/503; 370/514; 370/515; 370/436; 370/478; 370/329; 370/330

(58) Field of Classification Search ........... 455/41.2, 455/63.1, 507, 509, 511, 512, 515–517, 67.11, 455/63.2, 67.13, 114.2, 296, 500, 502; 370/503, 370/514–515, 464–465, 472, 329–330, 400–401, 370/478, 436; 375/132–134, 146–148, 346
See application file for complete search history.

(56) References Cited

U.S. PATENT DOCUMENTS

| | | | |
|---|---|---|---|
| 6,246,713 B1 | 6/2001 | Mattisson | |
| 6,377,608 B1 | 4/2002 | Zyren | |
| 6,466,608 B1 * | 10/2002 | Hong et al. | 375/137 |
| 6,549,784 B1 | 4/2003 | Kostic et al. | |
| 6,553,019 B1 | 4/2003 | Laroia et al. | |
| 6,590,928 B1 * | 7/2003 | Haartsen | 375/134 |

(Continued)

OTHER PUBLICATIONS

Office Action issued in U.S. Appl. No. 10/688,796, filed Feb. 04, 2008, 67 pgs.

*Primary Examiner*—Tuan A Tran
(74) *Attorney, Agent, or Firm*—Sprinkle IP Law Group

(57) ABSTRACT

A set of piconets and corresponding methods and computer programs may reduce contention time between piconets. In one embodiment, a seven-length code architecture may be used with group(s) of bands so that contention time cannot exceed 1/7 of the time. Up to seven different bands can be used within each group. When less than seven bands are used (e.g., three or six), at least one of the bands may be assigned to more than one dwell time during a time span. Alternatively, each dwell time within the time span may be assigned to a different band. The state may be changed as needed or desired. Substitution of extra bands may also be used. Using either scheme (repeated bands or changing states), a prime-number architecture can be used with a non-prime number of different bands. Simultaneous communications using at least two bands within a piconet may be used.

25 Claims, 11 Drawing Sheets

| | $t_0$ | $t_1$ | $t_2$ | $t_3$ | $t_4$ | $t_5$ | $t_6$ | $t_0'$ | $t_1'$ | $t_2'$ | $t_3'$ | $t_4'$ | $t_5'$ | $t_6'$ |
|---|---|---|---|---|---|---|---|---|---|---|---|---|---|---|
| CODE 1 | 0 | 1 | 2 | 3 | 4 | 5 | 6 | 0' | 1' | 2' | 3' | 4' | 5' | 6' |
| CODE 2 | 0 | 2 | 4 | 6 | 1 | 3 | 5 | 0' | 2' | 4' | 6' | 1' | 3' | 5' |
| CODE 3 | 0 | 3 | 6 | 2 | 5 | 1 | 4 | 0' | 3' | 6' | 2' | 5' | 1' | 4' |
| CODE 4 | 0 | 4 | 1 | 5 | 2 | 6 | 3 | 0' | 4' | 1' | 5' | 2' | 6' | 3' |
| CODE 5 | 0 | 5 | 3 | 1 | 6 | 4 | 2 | 0' | 5' | 3' | 1' | 6' | 4' | 2' |
| CODE 6 | 0 | 6 | 5 | 4 | 3 | 2 | 1 | 0' | 6' | 5' | 4' | 3' | 2' | 1' |

U.S. PATENT DOCUMENTS

| | | | |
|---|---|---|---|
| 6,731,939 B1 * | 5/2004 | Watanabe et al. | 455/450 |
| 6,920,171 B2 * | 7/2005 | Souissi et al. | 375/133 |
| 7,039,358 B1 | 5/2006 | Shellhammer et al. | |
| 2003/0152055 A1 * | 8/2003 | Aragones et al. | 370/338 |
| 2004/0196784 A1 | 10/2004 | Larsson et al. | |
| 2005/0286467 A1 | 12/2005 | Chang et al. | |

* cited by examiner

FIG. 2
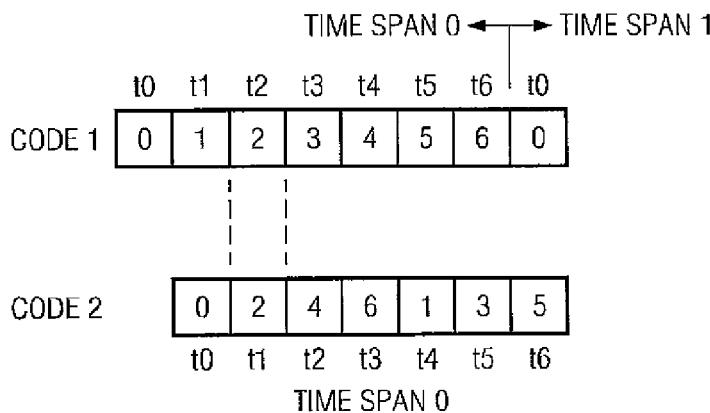
FIG. 5
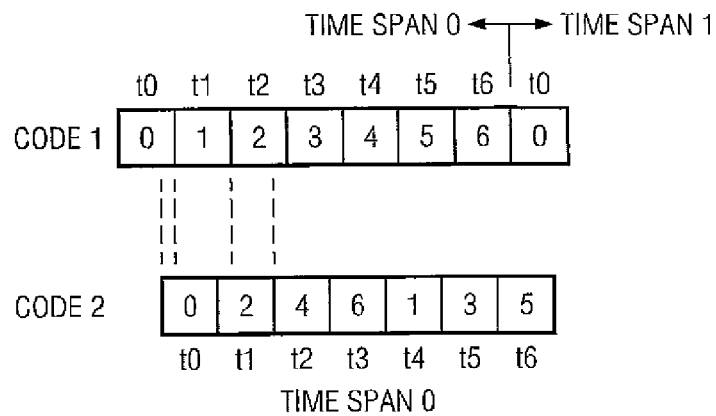
FIG. 6
FIG. 7

| CODE 1 | 0 | 1 | 2 | 3 | 4 | 5 | 6 |
|---|---|---|---|---|---|---|---|
| CODE 2 | 0 | 2 | 4 | 6 | 1 | 3 | 5 |
| CODE 3 | 0 | 3 | 6 | 2 | 5 | 1 | 4 |
| CODE 4 | 0 | 4 | 1 | 5 | 2 | 6 | 3 |
| CODE 5 | 0 | 5 | 3 | 1 | 6 | 4 | 2 |
| CODE 6 | 0 | 6 | 5 | 4 | 3 | 2 | 1 |
|  | t0 | t1 | t2 | t3 | t4 | t5 | t6 |

| CODE 1 | 0 | 1 | 2 | 3 | 4 | 5 | 6 |
|---|---|---|---|---|---|---|---|
| CODE 2 | 0 | 2 | 4 | 6 | 1 | 3 | 5 |
| CODE 3 | 0 | 3 | 6 | 2 | 5 | 1 | 4 |
| CODE 4 | 0 | 4 | 1 | 5 | 2 | 6 | 3 |
| CODE 5 | 0 | 5 | 3 | 1 | 6 | 4 | 2 |
| CODE 6 | 0 | 6 | 5 | 4 | 3 | 2 | 1 |
|  | t0 | t1 | t2 | t3 | t4 | t5 | t6 |

| CODE 1 | 0 | 1 | 2 | 3 | 4 | 5 | 6 | 0' | 1' | 2' | 3' | 4' | 5' | 6' |
|---|---|---|---|---|---|---|---|---|---|---|---|---|---|---|
| CODE 2 | 0 | 2 | 4 | 6 | 1 | 3 | 5 | 0' | 2' | 4' | 6' | 1' | 3' | 5' |
| CODE 3 | 0 | 3 | 6 | 2 | 5 | 1 | 4 | 0' | 3' | 6' | 2' | 5' | 1' | 4' |
| CODE 4 | 0 | 4 | 1 | 5 | 2 | 6 | 3 | 0' | 4' | 1' | 5' | 2' | 6' | 3' |
| CODE 5 | 0 | 5 | 3 | 1 | 6 | 4 | 2 | 0' | 5' | 3' | 1' | 6' | 4' | 2' |
| CODE 6 | 0 | 6 | 5 | 4 | 3 | 2 | 1 | 0' | 6' | 5' | 4' | 3' | 2' | 1' |
|  | t0 | t1 | t2 | t3 | t4 | t5 | t6 | t0' | t1' | t2' | t3' | t4' | t5' | t6' |

FIG. 12

| | t0 | t1 | t2 | t3 | t4 | t5 | t6 | t0' | t1' | t2' | t3' | t4' | t5' | t6' |
|---|---|---|---|---|---|---|---|---|---|---|---|---|---|---|
| CODE 1 | 0 | 1 | 2 | 3 | 4 | 5 | 6 | 0' | 1' | 2' | 3' | 4' | 5' | 6' |
| CODE 2 | 0 | 2 | 4 | 6 | 1 | 3 | 5 | 0' | 2' | 4' | 6' | 1' | 3' | 5' |
| CODE 3 | 0 | 3 | 6 | 2 | 5 | 1 | 4 | 0' | 3' | 6' | 2' | 5' | 1' | 4' |
| CODE 4 | 0 | 4 | 1 | 5 | 2 | 6 | 3 | 0' | 4' | 1' | 5' | 2' | 6' | 3' |
| CODE 5 | 0 | 5 | 3 | 1 | 6 | 4 | 2 | 0' | 5' | 3' | 1' | 6' | 4' | 2' |
| CODE 6 | 0 | 6 | 5 | 4 | 3 | 2 | 1 | 0' | 6' | 5' | 4' | 3' | 2' | 1' |

FIG. 13

| | t0 | t1 | t2 | t3 | t4 | t5 | t6 | t0' | t1' | t2' | t3' | t4' | t5' | t6' |
|---|---|---|---|---|---|---|---|---|---|---|---|---|---|---|
| CODE 1 | 0 | 1 | 2 | 3 | 4 | 5 | 6 | 0' | 1' | 2' | 3' | 4' | 5' | 6' |
| CODE 2 | 0 | 2 | 4 | 6 | 1 | 3 | 5 | 0' | 2' | 4' | 6' | 1' | 3' | 5' |
| CODE 3 | 0 | 3 | 6 | 2 | 5 | 1 | 4 | 0' | 3' | 6' | 2' | 5' | 1' | 4' |
| CODE 4 | 0 | 4 | 1 | 5 | 2 | 6 | 3 | 0' | 4' | 1' | 5' | 2' | 6' | 3' |
| CODE 5 | 0 | 5 | 3 | 1 | 6 | 4 | 2 | 0' | 5' | 3' | 1' | 6' | 4' | 2' |
| CODE 6 | 0 | 6 | 5 | 4 | 3 | 2 | 1 | 0' | 6' | 5' | 4' | 3' | 2' | 1' |

FIG. 14

| t0 | t1 | t2 | t3 | t4 | t5 | t6 |
|---|---|---|---|---|---|---|
| 0 | 1 | 2 | 3 | 4 | 5 | 6 |

FIG. 15

| t0 | t1 | t2 | t3 | t4 | t5 | t6 |
|---|---|---|---|---|---|---|
| 0 | 1 | 2 | 3 | 4 | 5 | 0 |

FIG. 16

| t0 | t1 | t2 | t3 | t4 | t5 | t6 |
|---|---|---|---|---|---|---|
| 0 | 1 | 2 | 0 | 1 | 2 | 0 |

METHOD AND SYSTEM OF PICONET GROUPS

CROSS-REFERENCE TO RELATED APPLICATIONS

This application is a continuation of, and claims a benefit of priority under 35 U.S.C. 120 of the filing date of U.S. patent application Ser. No. 10/688,796 by inventors Marcus Pendergrass and Vernon R. Brethour, entitled "METHODS AND SETS OF PICONETS USING TIME FREQUENCY DIVISION MULTIPLE ACCESS" filed on Oct. 17, 2003, which in turn claims priority under 35 U.S.C. § 119(e) to U.S. patent application Ser. Nos. 60/419,459 entitled "APPARATUS AND RELATED METHODS FOR HIGH-DATA RATE COMMUNICATIONS" filed on Oct. 17, 2002; 60/424,642 entitled "APPARATUS AND RELATED METHODS FOR HIGH-RATE COMMUNICATIONS" filed on Nov. 7, 2002; 60/432,435 entitled "APPARATUS AND RELATED METHODS FOR HIGH-DATA RATE COMMUNICATIONS" filed on Dec. 11, 2002; and 60/451,560 entitled "SYSTEM AND METHOD FOR MULTI-BAND UWB RADIO COMMUNICATIONS" filed on Mar. 3, 2003, the entire contents of all above cited references are hereby expressly incorporated by reference for all purposes. This application is related to U.S. patent application Ser. No. 10/688,274, entitled "METHODS AND APPARATUSES FOR REDUCING INTERFERENCE USING FREQUENCY DIVISION MULTIPLE ACCESS" filed on the same date as U.S. patent application Ser. No. 10/688,796, entitled "METHODS AND SETS OF PICONETS USING TIME FREQUENCY DIVISION MULTIPLE ACCESS", the entire contents of both of which are hereby expressly incorporated by reference for all purposes.

RELATED APPLICATIONS

This application claims priority under 35 U.S.C. § 119(e) to U.S. Patent Application Nos. 60/419,459 entitled "Apparatus and Related Methods for High-Data Rate Communications" filed on Oct. 17, 2002; 60/424,642 entitled "Apparatus and Related Methods for High-Rate Communications" filed on Nov. 7, 2002; 60/432,435 entitled "Apparatus and Related Methods for High-Data Rate Communications" filed on Dec. 11, 2002; and 60/451,560 entitled "System and Method for Multi-band UWB Radio Communications" filed on Mar. 3, 2003. This application is related to U.S. patent application No. 12/244,497, entitled "Methods and Apparatuses for Reducing Interference Using Frequency Division Multiple Access" filed on the same date as this application. All patent applications referenced in this paragraph are fully incorporated herein by reference.

1. Technical Field

The present invention generally relates to piconets, and more specifically to methods, computer programs, and piconets using different frequency bands within a frequency spectrum used for time frequency division multiple access.

2. Description of the Related Art

Efforts have been underway to develop wireless Personal Area Networks ("PANs"), a network of devices communicating data. Contention (two different devices in different PANs trying to communicate at or near the same frequency) and interference problems (other noise sources), collectively, "interference," where communication to or from either or both devices affects the quality of signal sent or received by either or both devices. Co-locating multiple PANs may require a significant amount of coordination; however, such coordination may be undesired.

One attempt to solve these problems is to use notch filters to exclude frequencies where known competing systems operate. Another attempt to solve the problems is to employ a frequency-notched antenna. Both of these attempts add to the complexity of a radio device. Moreover, these attempts to solve the problems result in a radio that is compatible only with the radio-frequency ("RF") environment for which it was designed. In other words, a change in RF environment might necessitate a design change for the notch filter or the frequency-notched antenna.

SUMMARY

A set of piconets, methods of establishing and using them, and computer programs for carrying out at least a portion of those methods may help to reduce contention time between piconets. In one embodiment, a seven-length code architecture may be used with one or more groups of bands so that contention time cannot exceed $\frac{1}{7}$ of the time times the number of group(s) of dwell times. Up to seven different bands can be assigned to each group of dwell times. When less than seven bands are used (e.g., three or six), at least one of the bands may be assigned to more than one dwell time. Alternatively, each dwell time within the time span may be assigned to a different band. The state may be changed as needed or desired. Using either scheme (repeated bands within a code or changing states), a prime-number architecture can be used with a non-prime number of different bands can be used.

Furthermore, methods and apparatuses for the mitigation of interference between piconets are depicted. These methods and apparatuses allow a device on a piconet to detect interference, characterize this interference, and the device or piconet to take appropriate action to ameliorate this interference. In many embodiments, interference between two piconets may be detected, and one or more of the devices on one of the piconets may cease transmitting on a set of bands while the other piconet continues to utilize these bands.

Additionally, electronic media are presented which embody this type of methodology in computer systems, hardware, and software that mitigates interference between piconets.

In one set of embodiments, a set of piconets can comprise piconets. Each piconet can have a unique code compared to the other piconets in the set of piconets. Each unique code corresponds to a sequence of dwell times and bands. During a time span, any two different piconets in the set of piconets are capable of using one or more same bands for a collective time for each group of dwell times, no longer than the longest dwell time within such group of dwell times.

Another aspect of the present invention can comprise a method of establishing a set of piconets. The method can comprise generating a set of codes similar to those described above and assigning the codes to the piconets.

In another set of embodiments, a set of piconets can comprise a first piconet and a second piconet. Within the set of piconets, the first piconet has a first code corresponding to a first sequence of designated bands, and the second piconet has a second code that corresponds to a second sequence of designated bands. At least one band may be present in the first sequence that is not present in the second sequence.

In still another aspect of the present invention, a method of using a set of piconets comprising the first piconet. Each piconet in the set of piconets may have a unique code compared to the other piconets. Each of the unique codes can correspond to a sequence of dwell times and bands including the first band, wherein the sequence includes at least one group of dwell times. The method can comprise changing a state of the first band. The state may be changed from a designated state to an undesignated state, or vice versa.

In a further set of embodiments, a piconet can comprise a code that corresponds to the utilization of different bands during a time span of seven dwell times. In yet another further aspect, a method of the using the piconet can comprise assigning the code to a device within the piconet and communicating to at least one other device within the piconet using the code.

In still a further aspect, portions or any or all of the methods may be implemented using a computer program. The computer program can comprise a computer-readable medium adapted to execute instructions when the computer program is run on a computer.

In one set of embodiments, one or more devices on a second piconet cease transmitting on a second set of bands while the first piconet continues to utilize this second set of bands.

In one set of embodiments, ceasing transmission on the first set of bands is done for a predetermined time period.

In one set of embodiments, the first set of bands and the second set of bands are substantially orthogonal.

In one set of embodiments, a packet error rate is evaluated to determine if interference is present.

In one set of embodiments, the first set of bands is monitored by the first piconet.

In one set of embodiments, transmission is resumed by one or more devices on one or more of the bands if no activity is detected within the first set of bands.

The foregoing general description and the following detailed description are exemplary and explanatory only and are not restrictive of the invention, as defined in the appended claims.

BRIEF DESCRIPTION OF THE DRAWINGS

The present invention is illustrated by way of example and not limitation in the accompanying figures.

FIG. 2 includes an illustration of a frequency spectrum separated into frequency bands.

FIG. 5 includes a table codes for different sequences of the frequency bands from FIG. 2.

FIGS. 6 and 7 illustrates exemplary potential timing differences between Code 1 and Code 2.

FIGS. 12 and 13 include tables of codes illustrating frequency bands that are in designated or undesignated states.

FIGS. 14-16 include illustrations of a seven-length architecture using 7, 6, or 3 different bands to generate a code for a piconet.

Figure 1:
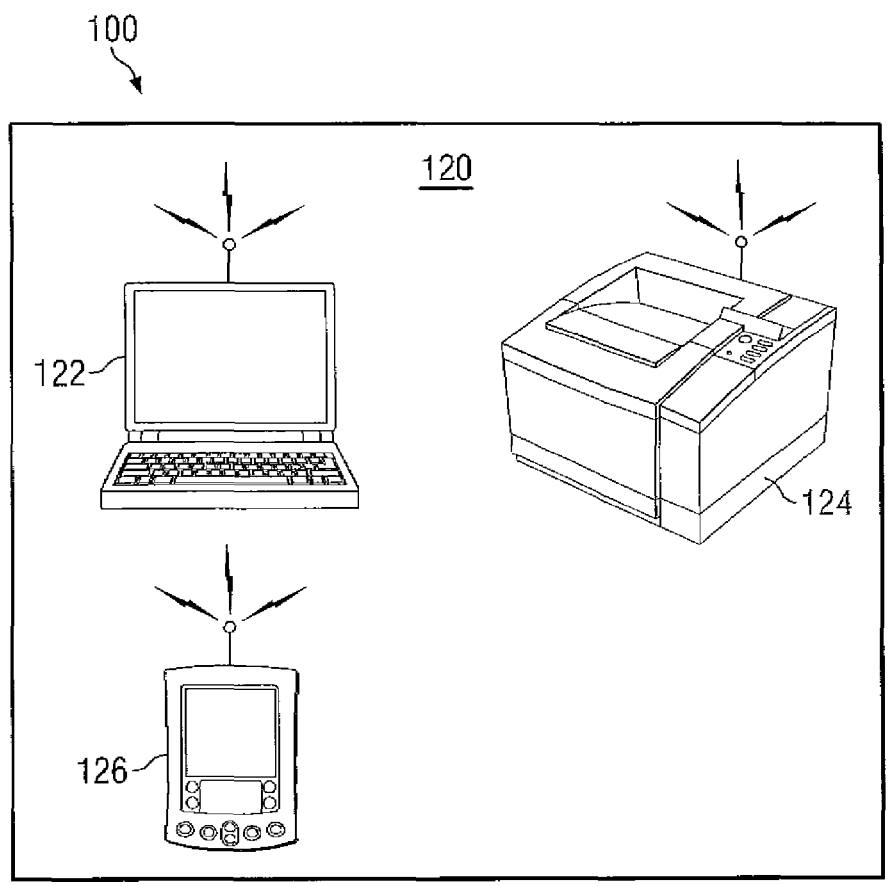
FIG. 1 includes an illustration including two piconets, each of which includes a plurality of devices that can communicate to one another within its particular piconet.
Figure 1:
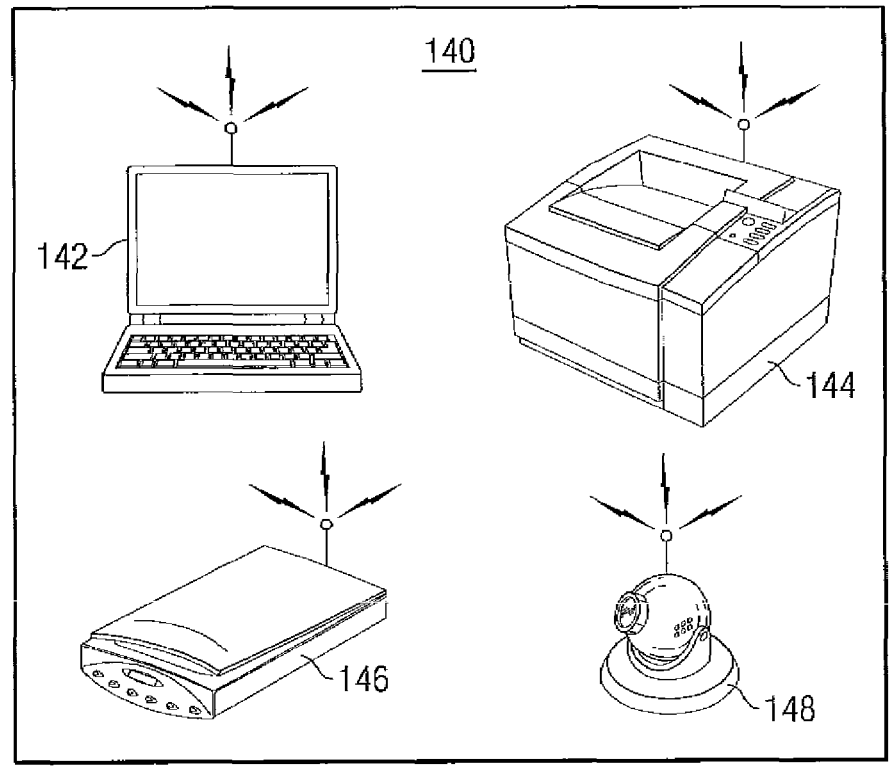

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Reference is now made in detail to the exemplary embodiments of the invention, examples of which are illustrated in the accompanying drawings. Wherever possible, the same reference numbers will be used throughout the drawings to refer to the same or like parts (elements).

A set of piconets, methods of establishing and using them, and computer programs for carrying out at least a portion of those methods may help to reduce contention time between piconets. In one embodiment, a seven-length code architecture may be used with one or more groups of bands so that contention time cannot exceed $1/7$ of the time times the number of group(s) of dwell times. Up to seven different bands can be assigned to each group of dwell times. When less than seven bands are used (e.g., three or six), at least one of the bands may be assigned to more than one dwell time during a time span. Alternatively, dwell time may be assigned to a different band. The state may be changed as needed or desired. Using either scheme (repeated bands within a code or changing states), a prime-number architecture can be used with a non-prime number of different bands.

Before proceeding further, some terms are defined or clarified. As used herein, the term "band" is intended to mean a frequency band.

The term "contention" is intended to mean two or more devices are transmitting at the same or similar frequency such that a receiving device has difficulty receiving or understanding a transmission from its corresponding transmitting device.

The term "designated" is intended to mean a state of a band in which a piconet currently can communicate in the set of piconets using that specific band. A band in a designated state may also be referred to as being on or active. The band may be in a designated state for the entire set of piconets or only for specific piconet(s) within the set, only for specific device(s) within a piconet, or combinations of individual piconet(s) and device(s).

The term "dwell time" is intended to mean a time period within a time span. Dwell time may also be referred to a "symbol."

The term "interference" is intended to mean signals, regardless of source that makes receiving or understanding a transmission from a transmitting device more difficult. Interference includes contention and noise.

The term "noise" is intended to mean signals from any source other than a device in a neighboring piconet. Examples can include a microwave oven, a vacuum cleaner, or the like.

The term "optical signals" is intended to mean signals communicated over a wireless communicating medium at a frequency of at least one terahertz ("THz"). One terahertz equals $10^{12}$ hertz. Note that signals communicated over a wireless communicating medium within the ultraviolet range and higher frequencies outside the visible light spectrum are considered optical signals for the purpose of this specification.

The term "RF signals" is intended to mean signals communicated over a wireless communicating medium at a frequency less than one THz.

The term "time span" is intended to mean a sum of the dwell times during which a piconet may communicate using a sequence of bands before repeating the sequence.

The term "undesignated" is intended to mean a state of a band in which a piconet currently cannot communicate using that specific band. A band in an undesignated state may also be referred to as being off or inactive. The band may be in an undesignated state for the entire set of piconets or only for specific piconet(s) within the set, only for specific device(s) within a piconet, or combinations of individual piconet(s) and device(s).

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is clear that it is meant otherwise.

Before addressing specific implementation details, a relatively high-level description is given regarding a set of piconets and its operation. A frequency spectrum may be separated into bands. All of those bands may be within one or more groups of bands. The frequencies for the bands may be chosen to enable a multiple mixer type of synthesis.

Some or all of the bands within the frequency spectrum may be used for relatively high data rate transmissions between devices within a piconet. One or more bands within the frequency spectrum may need to be dedicated or reserved for other purposes (e.g., low data rate transmissions, regulatory requirements, etc.) (hereinafter, collectively referred to as "reserved bands"). The reserved band(s) may lie between any of the bands for high data rate communications or at either or both ends of such high data rate communication bands. For the purposes of this specification, the piconet will be addressed using bands of the frequency spectrum for high data rate communications, and does not include the reserved bands.

In one embodiment, a time span may include one or more groups of dwell times. The number of dwell times ("p") within each group of dwell times may be equal to the number of possible bands for the high data rate transmissions. In one embodiment, p is a prime number. When more that one group of dwell times is used, the groups can have the same or different prime numbers of dwell times. Within a group of dwell times, the number of possible piconets that can be supported within a set of piconets may be p-1.

Unique code sequences can be generated for the piconets by generating a different sequence of band utilization during different time periods. The codes may correspond to the sequence in which the bands are used during a time span. When p is a prime number, two or more devices may contend for the same band no longer than the longest dwell time within for each group of dwell times. The bands may be part of a single group or divided between two or more groups. Each group may have a prime number of bands. In one embodiment, the sequence of bands assigned to each piconet may be generated using a linear congruential technique.

Dwell times within a time span may be equal to one another. Equal dwell times can be easier to implement within devices, so that each frequency is used for approximately the same length of time during one time span. The pulse rate can be substantially equal to 1/(dwell time). Contention time (time that any two different devices are competing for the same band) may be one dwell time (1/p times the time span) for a group of dwell times. In another embodiment, dwell times of different lengths may be used. For example, in a single group of bands, a first dwell time may be 1.5 times longer than a second dwell time, a third dwell time may be 1.2 times longer than the second dwell time, and the rest of the dwell times during the time span are the same length as the second dwell time. The longest contention time during a time span for this embodiment is no greater than the longest dwell time for the time span, which in this embodiment, is the time length of the first dwell time.

The bands may be any frequency, so long as, at a specific band, interference caused by immediately adjacent band(s) is at a level that does not significantly interfere with communications at the specific band. If interference is too great, the bands may need to be spaced further apart. In one embodiment, the use of individual bands within the frequency spectrum and the codes described herein coupled with multiband can yield a piconet to piconet isolation of 7 to 1, which in turn translates to approximately 8.5 dB in amplitude or 17 dB in power code isolation between bands.

The band separation between each pair of adjacent bands (center to center) within the spectrum may be equal to or a multiple of the smallest band separation when the spectrum has three or more bands. When the band separations between each pair of adjacent bands are equal to or multiples of the smallest band separation, fewer oscillators may be used in the devices in the piconets, and may be at little as one oscillator. In one embodiment, the band separation may be at least 400 MHz. Smaller band separations may be used if desired. In another embodiment, band separation between bands may not be equal to or a multiple of a single frequency. Also, the bands may or may not be contiguous with other bands in the frequency spectrum. In other words, a gap in frequency may lie between two neighboring bands and will be described in more detail later in this specification.

Each device may communicate within its piconet using up to p bands. However, in one embodiment, using all p bands for a specific piconet may not be desired for any number of reasons. Therefore, the piconet may use fewer than all p bands. The piconet may use a number of bands in a designated state ("n"), which may be an integer from 1 to p. The piconet may have other band(s) in an undesignated state, if any. The number of undesignated bands can be equal to p-n, which may have integer values from 0 to p-1. Note that a specific band may be in a designated state or undesignated state for one, some, or all piconets within the set of piconets. Also, the states within one piconet or other piconets for one, some, or all devices can be changed between the states.

Attention is now directed to details of non-limiting embodiments. In FIG. 1, set of piconets ("set") 100 includes piconet 120 and piconet 140, each of which includes a plurality of devices. Other piconets may be present within set 100 but are not shown in FIG. 1. An example of a piconet is a Personal Area Network ("PAN"). A PAN is smaller than a Local Area Network ("LAN"), which is in turn smaller than a Wide Area Network ("WAN"). The set 100 may be located in the same building, and in one embodiment, each piconet may be located within an office or cubicle, and the piconets may be located in adjacent offices or cubicles on the same or adjacent floors (levels) of the building. Each piconet within set 100 may be less than 100 meters away from its nearest neighboring piconet, and in one embodiment may be separated by less than a meter (e.g., a wall or partition). Note that the geographic configurations described in this paragraph are exemplary and not limiting. After reading this specification, skilled artisans will appreciate that a nearly limitless number of other geographic configurations are possible.

Devices within piconet 120 include laptop computer 120, printer 124, and personal digital assistant ("PDA") 126, and devices within piconet 140 include laptop computer 140, printer 144, scanner 146, and camera 148. Other devices (pagers, cell phones, etc.) could be used. Although each device in piconets 120 and 140 are shown to have external antennas, such external antennas are not required but are shown to illustrate communication between devices using a wireless communicating medium. Each of the devices may include a transceiver, a receiver, or a transmitter. Any combination of devices within piconet 120 or 140 may be bi-directionally coupled to each other within the same piconet.

Each of the devices in piconets 120 and 140 may include one or more of a central processing unit ("CPU"), read-only memory ("ROM"), random access memory ("RAM"), hard drive ("HD") or storage memory, and input/output device(s) ("I/O"), such as a transmitter, receiver, transceiver, or other I/O device, such as a keyboard, monitor, printer, electronic pointing device (e.g., mouse, stylus, trackball, etc.), or any combination thereof. Each of the devices in FIG. 1 may have more than one CPU, ROM, RAM, HD, I/O, or other hardware components.

Portions of the methods described herein may be implemented in a computer program comprising a computer-readable medium adapted to include instructions to be executed when the computer program is run on a computer. The computer-readable medium can include ROM, RAM, or HD of the device(s). In addition to those types of memories, the computer program may be contained on a data storage device, which may also be a computer-readable medium with a different device. Alternatively, the instructions may be stored as software code elements on another computer-readable medium, such as a DASD array, magnetic tape, floppy diskette, optical storage device, or other appropriate storage device.

In an illustrative embodiment, the computer-executable instructions may be lines of assembly code, compiled C++, Java, or other language code. Other architectures may be used. For example, the functions of any one of the devices may be performed by a different device shown in FIG. 1. Additionally, a computer program or its modules with such code may be embodied in more than one data processing system readable medium in more than one device.

Communications between any of the devices in FIG. 1 may be accomplished using RF signals. During any one or more of the communications, data may be transmitted to or received from any one or more devices. For example, when a user is at laptop computer 122, laptop computer 122 may convert the signals to a human understandable form when sending a communication to the user and may convert input from a human to appropriate RF signals to be used by laptop computer 122 or PDA 126. Similarly, when an operator is at PDA 126, PDA 126 may convert the signals to a human understandable form when sending a communication to the operator and may convert input from a human to appropriate RF signals to be used by devices 122 or 126.

Additionally, any one or more of the devices in FIG. 1 may use more than one communicating medium. For example, laptop computer 122 may use RF communications with devices within piconet 120 but may use a wired ethernet connection to communicate to devices connected to a LAN, some of which may or may not be shown in FIG. 1. For example, computers 122 and 142 may be part of the same LAN and communicate to each other using electronic signals over a wired ethernet connection, rather than by RF signals used by their respective piconets.

Returning to FIG. 1, within set 100, contention by two different devices in different piconets should be kept relatively low. The coding scheme and method of using the coding scheme are described below to help reduce the interference problems. The embodiments described herein are useful for Ultra-Wide Band ("UWB") applications, but are not limited to UWB.

Figure 3:
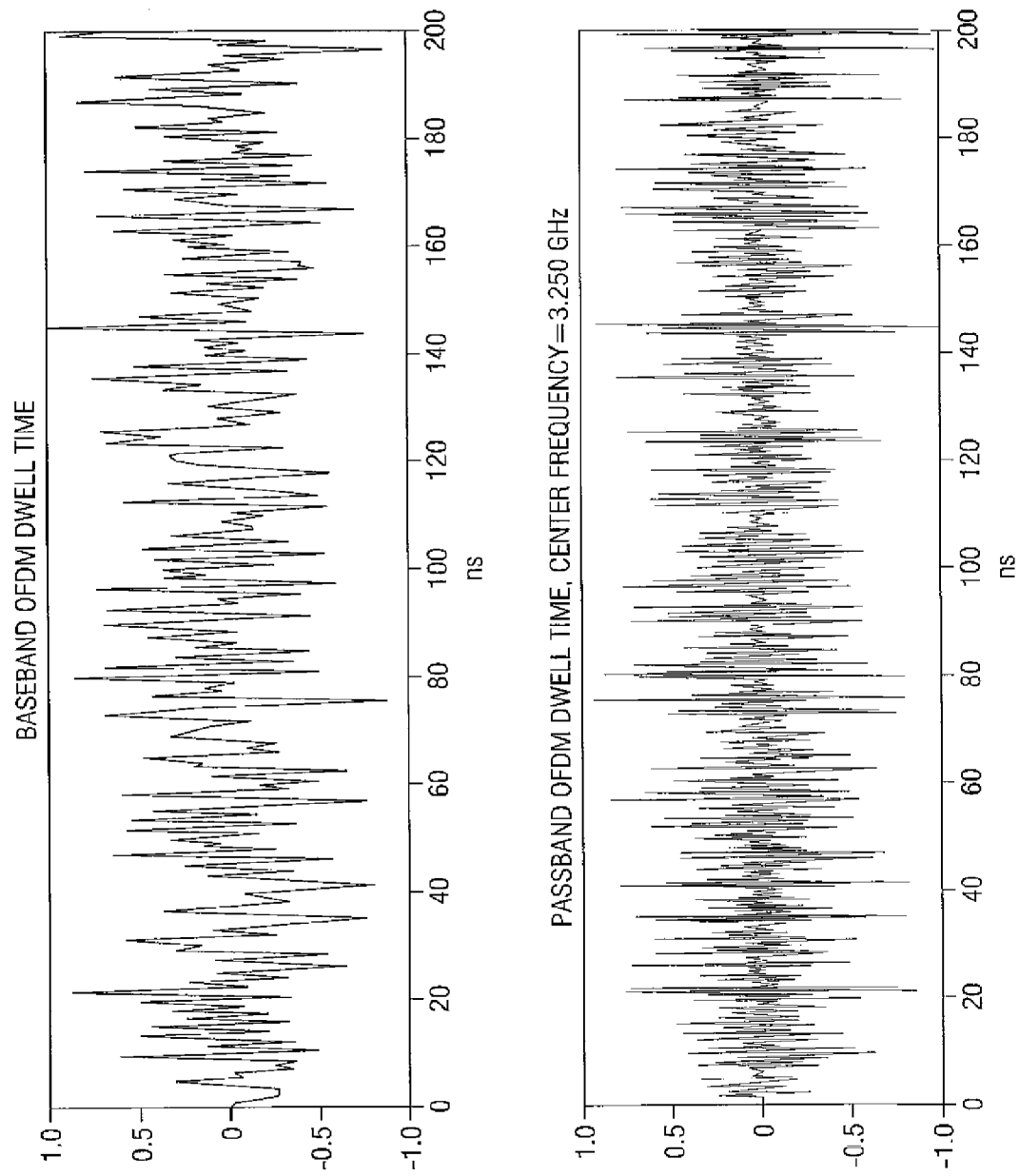
FIG. 3 includes illustrations of baseband and passband waveforms when using Orthogonal Frequency Division Multiplexing ("OFDM").

Attention is now directed to a non-limiting example with reference to FIGS. 1-3. A spectrum of frequencies can be separated into a single group of seven different bands numbered 0-6 in FIG. 2. In this embodiment, the seven bands are equal in size (frequency range) and are contiguous (no gaps) between neighboring bands. In one embodiment, each of the bands may be approximately 500 MHz wide when used with UWB. If a band is too narrow, interference from adjacent bands may be too high. As the width of the band increases, the number of bands available within the frequency spectrum decreases, thus increasing the potential contention time between devices in different piconets. After reading this specification, skilled artisans can choose the size of band that best fit their specific application.

Embodiments of the invention may be used for Orthogonal Frequency Division Multiplexing ("OFDM"). FIG. 3 includes illustrations of baseband and passband signals during a dwell time. For the upper illustration in FIG. 3, the waveform is illustrated as it appears at the output of an Inverse Fast Fourier Transform ("IFFT"). The output is referred to as a baseband transform because it has not yet been mixed with a carrier frequency. The lower illustration is for a passband waveform and illustrates the baseband waveform after it has been mixed with a carrier frequency. Mixing can be accomplished by multiplying the baseband waveform (upper illustration) by a sine wave at a predetermined frequency, which for this specific embodiment is 3.25 GHz.

Figure 4:
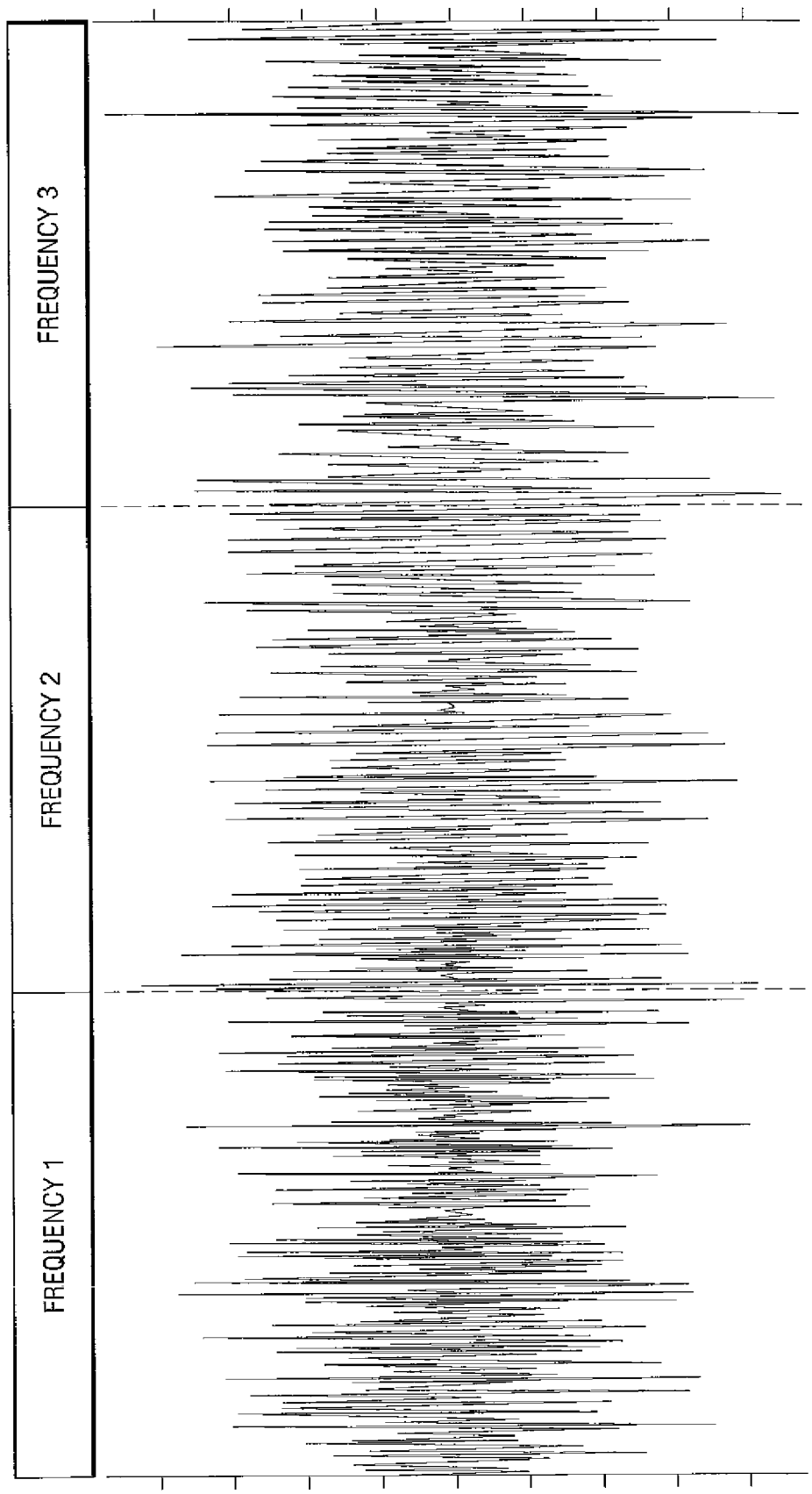
FIG. 4 includes an illustration of a passband waveform when using OFDM for three consecutive dwell times.

Continuing with OFDM, different frequencies may be used during dwell times to produce the passband waveform as illustrated in FIG. 4. Each portion of a baseband waveform for three consecutive dwell times may be mixed with different carrier frequencies for the three consecutive dwell times (illustrated by the dashed lines) to produce the passband waveform in FIG. 4. More specifically, Frequency 1 is used as the carrier frequency during a first dwell time, Frequency 2 is used as the carrier frequency during a second dwell time, and Frequency 3 is used as the carrier frequency during a third dwell time. Each of Frequencies 1, 2, and 3 may correspond to different bands.

Time/frequency sequences can be generated for up to six piconets in the set 100 to form Codes 1-6 as shown in FIG. 5. Dwell times ($t_0$, $t_1$, $t_2$, etc.) for a time span are identified near the bottom of FIG. 5. The dwell times may be on the order of 3 ns, 30 ns, or 300 ns. The pulse rates are the inverse of dwell times and may be on the order of 3 MHz, 30 MHz, or 300 MHz. In alternative embodiments, dwell times and pulse rates may be less than or greater than those described above. In this example, all the dwell times are substantially equal to one another.

Referring to the first line of the table in FIG. 5, Code 1 can be assigned to piconet 120. Assuming all bands for all devices in the table are in a designated state, during dwell time $t_0$, devices within piconet 120 can use band 0, and during dwell time $t_1$, devices within piconet 120 can use band 1. During the subsequent dwell times, bands 2, 3, 4, 5, and 6 can be used by piconet 120 in that sequence. Code 2 can be assigned to piconet 140. During dwell time $t_0$, devices within piconet 140 can use band 0, and during dwell time $t_1$, device(s) within piconet 140 can use band 2. During the subsequent dwell times, bands 4, 6, 1, 3, and 5 are used by piconet 140 in that sequence. The band sequences in the other lines for other parts are illustrated in FIG. 5. The sequences can be repeated any number of times during subsequent time spans.

For any code shown in FIG. 5, device(s) in a piconet will potentially contend with other device(s) in another piconet during no more than one time during one time span for a group of dwell times, which in this example is approximately 1⁄7 of the time. Referring to FIG. 5, the devices in set 100 may contend for band 0 during $t_0$. However, the devices in different piconets do not contend for same band during $t_1$-$t_6$.

In practical applications, device(s) in piconet 120 and device(s) in piconet 140 may not turn on at the same time. For example, piconet 140 (Code 2) may be turned on after piconet 120 (Code 1 as illustrated in FIG. 6). When piconet 140 turns on, it may start at $t_0$ while piconet 120 is already at $t_1$. In another words, Code 2 is shifted one unit to the right. Therefore, $t_1$ of piconet 120 occurs at substantially the same time as $t_0$ of piconet 140. While piconet 120 is at $t_0$ during the next time span, piconet 140 will be at t6. As can be seen in FIG. 6, piconets 120 and 140 contend for band 2 during substantially the same time period.

FIG. 7 is similar to the embodiment described with respect to FIG. 6 but illustrates a variation. In FIG. 7, piconet 140 may not be turned on at an even increment with respect to piconet 120's time spectrum. For example, piconet 140 may be turned on 3⁄4 of the way through piconet 120's $t_0$. In this embodiment, piconets 120 and 140 contend for band 0 for 1⁄4 of a dwell time and contend for band 2 for 3⁄4 A of a dwell time. Therefore, two piconets may contend for more than one band during a single time span. However, collectively, the time of contention during a length of time corresponding to single time span does not exceed the longest dwell time. Because each of the dwell times has substantially the same length in this embodiment, the contention time per time span is approximately the dwell time.

Due to a variety of reasons, a piconet or specific device(s) within a piconet may be having problems communicating over a specific band. For example, camera 148 in piconet 140 may contend with communications on band 6 within piconet 120. Alternatively, other radiation sources (e.g., a microwave oven), electromechanical apparatuses (e.g., a vacuum cleaner), or other noise source may be interfering with piconet 120.

Figures 8, 9, 10, 11:
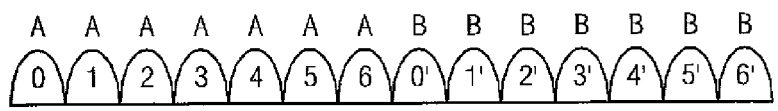
FIGS. 8 and 9 include tables of codes illustrating frequency bands that are in designated or undesignated states.
FIG. 10 includes an illustration of a frequency spectrum separated into two groups of frequency bands.
FIG. 11 includes a table codes for different sequences of the frequency bands from FIG. 10.

In one embodiment, all piconets in set 100 may be having problems communicating using band 6. Effectively, band 6 cannot be used by any of the piconets in set 100. Referring to FIG. 8, the state of band 6 is changed from a designated state to an undesignated state for all piconets within set 100. As illustrated in FIG. 8, bands in the undesignated state have a diagonal line through them, and bands in the designated state do not have the diagonal line. Data that would otherwise be transmitted over band 6 will be shunted to the next available time period. Referring to piconet 140, its devices may communicate at all times except at $t_3$. Communications that would otherwise be transmitting data using piconet 140 using band 6 during $t_3$ are delayed and transmitted using piconet 140 on band 1 during $t_4$. Note that the seven discrete dwell time architecture remains intact, and therefore, no more than one contention time occurs with another piconet in the set 100 during a time span. However, devices in piconet 140 do not have any communications within the piconet 140 during $t_3$. Thus, the piconet is configured to allow relatively high data rate transmissions without contention time greater than one dwell time per time span group of bands.

In an alternative embodiment, a new band is substituted for an existing band if interference is too great on that existing band. For example, band 7 (extra band, not shown) may be substituted for band 6 (existing band). Referring to FIG. 8, all occurrences of band 6 are replaced by band 7. In one implementation, band 7 may be an extra band. If a band in a designated state, such as band 6, and it needs to be changed to an undesignated state, then band 7, which may originally be in an undesignated state is changed to a designated state. After a set time or interference is at an acceptably low level, band 6 may be substituted for band 7. Alternatively, band 6 may now become the extra band and will be substituted for another band when that other band changes from a designated state to an undesignated state. Before the substitution, the code may correspond to band 6 and not band 7, and after the substitution, the code may correspond to band 7 and not band 6. The ability to substitute extra bands for existing bands is another novel aspect that helps to keep data transmission rates high while keeping contention relatively low.

FIG. 9 illustrates another embodiment, where more than one band may be changed from the designated to the undesignated state. For example, bands 1, 3, 4, and 6 may be changed from a designated state to an undesignated state. Data that would otherwise be transmitted over the bands in the undesignated state are shunted to other bands in the designated state (bands 0, 2, and 5).

At a later time, one or more-of the bands in the undesignated state in FIGS. 8 and 9 may be changed from the undesignated state to the designated state. As more bands are in a designated state, data rates for the communications within the piconet(s) increases. Command(s) to change between designated and undesignated states may originate within the device where such change is taking place or from a command center for the piconet. For example, laptop computer 122 may be a command center and a device within piconet 120. Alternatively, a separate, dedicated command center (not shown) for piconet 120 may be used. Alternatively, changes in state may be performed manually. For example, dip switches or a ROM integrated circuit may be changed to affect the changes in state.

The bands within a device or piconet may originally be in a designed state, an undesignated state, or a combination thereof (at least one band originally in a designed state and at least one other band in an undesignated state).

The states of the bands may be changed as circumstances warrant. For example, referring to FIG. 8, band 6 may be changed from an undesignated state to a designated state after a set time period (a minute, an hour, a day, a week, or nearly any other time period). If the interference in band 6 is still unacceptably high, band 6 may again be changed from a designated state to an undesignated state. Alternatively, a piconet (via a command center or other device) may monitor the interference level from interference on band 6 while it is in the undesignated state. After the event has been terminated (e.g., microwave oven or vacuum cleaner turned off) and the interference level from interference on band 6 is reduced to an acceptable level, band 6 may be changed from an undesignated state to a designated state. Note that a set time period may not be used to determine when the state should be changed if the interference level is being monitored. A combination of the two may also be used. In other words, the interference level on band 6 may be monitored occasionally (e.g., every minute, every hour, etc.) rather than substantially continuously (e.g., at least one per second) while in the undesignated state and when the interference level is reduced to an acceptable level, band 6 may be changed from the undesignated state to the designated state.

A frequency spectrum may be separated into more than one group of bands due to reasons unrelated to the present invention. The groups of bands may be used during corresponding groups of dwell times. In one embodiment, a frequency spectrum may be separated into 16 bands, of which, two bands are reserved bands (not shown in FIG. 10). Therefore, 14 bands may be used for high data rate communications within the piconet. The 14 bands may be separated into two groups of seven bands as illustrated in FIG. 10. In one embodiment, each group of bands and dwell times may have prime number(s). In another embodiment, the groups may have dissimilar number of bands or dwell times. The reserved bands (not shown in FIG. 10) may lie between any of the bands shown in FIG. 10. In one embodiment, a reserved band may lie between band 6 and band 0'. After reading this specification, skilled artisans will appreciate that the reserved band(s) may be located between other bands or near the ends of the bands in FIG. 10.

FIG. 11 illustrates different code sequences for Codes 1-6. In this embodiment, the demarcations of the groups of bands and dwell times can be seen. One group of bands (bands 0-6) may be used during one group of dwell times ($t_0$-$t_6$). In this design, each of the six piconets has more RF bandwidth available for transmission, resulting in more reliable transmission of information. Although not shown, the bands from the different groups may be interspersed with one another within the code sequence. Alternatively, the groups of bands may be switched for the specific code. For example, Code 1 may use bands 0'-6' during $t_0$-$t_6$ and bands 0-6 during $t_0'$-$t_6'$, whereas the rest of the codes in FIG. 11 remain unchanged. Devices within piconets 120 and 140 may be configured for both groups. Any or all of the piconets or devices within a piconet may be reconfigured for only one group, and may be reconfigured at a later time for one or both groups of bands and dwell times. The manner for configuring and reconfiguring can be performed using methods similar to those described with respect to changing states of the bands (designated state versus undesignated state).

In an alternative design, each of the six piconets can transmit a signal simultaneously on the bands k and k' of FIG. 10, where k is 0, 1, 2, 3, 4, 5, and 6; and k' is 0', 1', 2', 3', 4', 5', and 6'. In effect, dwell times $t_k$ and $t_{k'}$ occur simultaneously in this embodiment. In this design, higher rates of data transmission are enabled by the simultaneous transmission of signals. The ability to communicate within a piconet using two or more bands simultaneously is believed to be a novel aspect that allows raw data rates over 1 gigahertz (GHz) to be achieved.

Still another design using the bands of FIG. 10 enables up to 12 piconets by assigning codes 1 through 6 of FIG. 5. to the first six piconets, while assigning codes 1' through 6' to the last six piconets, where code k' is obtained from code k by substituting the frequency bands from Group B in FIG. 10 for the corresponding bands in Group A. For example, code 3' would be the sequence 0', 3', 6', 2', 5, 1', 4'.

Although two groups of bands and dwell times are described, more groups can be used. The maximum contention time per time span may be sum of the longest dwell times for each group. If all dwell times are substantially equal, the maximum contention time per time span can be the product of the number of groups times the dwell time.

Similar to the embodiments with one group (FIGS. 6 and 7), bands may be in designated and undesignated states. FIG. 12 includes an illustration where bands 0-6 and 0'-2' can be in the designated state and bands 3'-6' can be in the undesignated state. Therefore, each device may communicate using 10 bands. FIG. 13 includes an illustration where most piconets can use up to 12 bands. All bands for most piconets are designated except for 1 and 5'. Therefore, bands from different groups may be in the undesignated state. Also, note that the piconets for Codes 2 and 3 may have band 3' in the undesignated state. This embodiment illustrates that bands for individual piconets (codes) may be in the undesignated state while the same band in other piconets in set 100 may be in a designated state.

Many other embodiments of the present invention may be possible. A piconet may use a code that corresponds to the utilization of different bands during a time span of seven dwell times as seen in FIGS. 14-16. In one embodiment, seven different bands may be used once during each of the dwell times in a time span as illustrated in FIG. 14. Note that this code sequence is the same as Code 1 as illustrated in FIG. 5. One, some, or all devices within the piconet can use the same code.

In another embodiment, only six different bands (0-5) are used with the seven-length code architecture as illustrated in FIG. 15. Note that band 0 is used during two different dwell times ($t_0$ and $t_6$). In still another embodiment, only three different bands (0-2) are used with the seven-length code architecture as illustrated in FIG. 16. Note that band 0 is used during three different dwell times ($t_0$, $t_3$, and $t_6$), and band 1 and 2 are used during two different dwell times. An advantage of this embodiment, compared to changing states of bands between designated and undesignated states, is that communications may be substantially continuous during a time span. However, the number of neighboring piconets may be limited or contention time may increase. Designers, users, or both of such piconet(s) may be able to configure piconet(s) to meet their particular needs regarding contention time and data rates (e.g., choose between changing states or using a smaller number of different bands within the seven-length code architecture.

Embodiments described herein may allow users of set 100 to achieve advantages over conventional systems. For one group of bands within any time span, the contention time between devices in any pair of piconets in set 100 per time span per group of bands and dwell times may be as little as 1/p, where p is the number of dwell times in a time span. The set of piconets may support up to p-1 piconets and still have relatively low contention time.

Another advantage is that uncoordinated piconets may be used. In other words, an overriding coordinating architecture does not need to be used for different piconets or between different devices within one or more piconets. Piconet(s) and device(s) may be added or removed with relative ease. When a device is added or removed, the change may be transparent to the other devices within the same or other piconets. Such changes may be made without substantially adversely impacting the other device(s) or piconet(s) and obviates the need for coordination between different piconets, devices, or both. Still, if a user desired, piconets may be coordinated with one another, if desired.

Band utilization for set 100, individual piconet, or individual device is highly flexible. Individual bands for a piconet or device may be in a designated state or undesignated state. A band may be changed from a designated to an undesignated state for any number of reasons. The change in state may allow better data transmissions to occur without as much contention, noise, or other interference from other piconets, devices, or other sources. The state may subsequently be changed to a designated state after a set time period or after the event causing contention, noise, or other interference terminates. Such an embodiment allows the number of bands in the designated state to remain relatively high.

A piconet or device may be configured for nearly any number of groups of bands. The piconet or device may be reconfigured regarding the group(s) at a later time. For example, if the number of piconets exceeds the limit for the set of piconets, another group of bands may be added to allow more devices to use the piconet.

Implementation of embodiments may be made without significantly complicating designs of piconets or devices. The bands within a frequency spectrum may all be substantially the same size, and the center-to-center band separation may be substantially equal or substantially a multiple of the smallest band separation. Also, dwell times for the bands and the pulse rates for the bands can be substantially the same. Fewer oscillators may be required and piconets and devices may have a common design.

When utilized with a multiple piconet embodiment, the use of individual bands within the frequency spectrum and the codes described above coupled with multiband can yield a piconet to piconet isolation of 7 to 1. This in turn translates to around 8.5 dB in amplitude or 17 dB in power. This degree of separation may be sufficient during ordinary usage, however, in a densely packed environment band to band bleedover coupled with the proximity of piconets and the placement of transceivers within each piconet, may reduce the isolation between piconets to a figure approaching zero.

Figure 17:
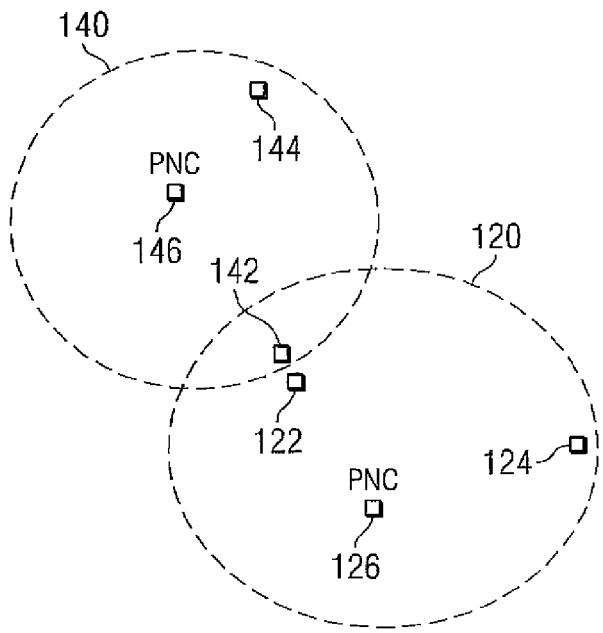
FIG. 17 is a physical representation of the overlapping geographical areas covered by two piconets.

FIG. 17 illustrates just such a situation. Piconet 120 is located in close proximity to piconet 140. In fact, piconet 120 and piconet 140 may be located in such close physical proximity that the physical areas encompassed by the transmissions of each piconet 140, 120 may overlap. This may occur, for example, if each piconet 140, 120 is being utilized within two adjacent apartments in a complex.

One of the results of the close physical proximity of piconets 140, 120 is that device 142 within one piconet 140 may interfere with device 122 within another piconet 120. This interference may occur because device 142 on piconet 140 is transmitting on the same band on which device 122 is attempting to receive. Interference may also result from the physical surroundings present within, or extraneous to, each piconet 140, 120. For example, one device 142 on piconet 140 may transmit on a band during one dwell period, but because of the physical surroundings reflections of this transmission may be present during subsequent dwell periods. These echoes may cause device 122 on distinct piconet 120 attempting to receive on the same band during the next dwell period to drop an unacceptable number of packets.

These interference problems may also be exacerbated by the placement of devices 142, 146, 122, 124, 126 within their respective piconets 140, 120. Device 122 within piconet 120 may be receiving from another device 124 located at the extremities of the range of piconet 120. Because device 142 on another piconet 140 is transmitting in close proximity to receiving device 122, receiving device 122 may be overwhelmed by the signal from device 142 and drop packets transmitted from transmitting device 124.

One possible solution to these interference problems would be to assign separate frequencies to each piconet 140, 120. Separating the frequency spectrum between piconets 140, 120 in this manner would allow devices 142, 144, 146, 122, 124, 146 on piconets 140, 120 to communicate with other devices on their respective piconets 140, 120 without much interference. This is inefficient, however, as the frequency spectrum is only partially utilized by each piconet 140, 120, and in the presence of many piconets this approach can lead to a significant degradation of performance.

The codes described above may also be helpful in reducing interference on each piconet 140, 120, and between distinct piconets 140, 120, but piconets 140, 120 in close physical proximity to one another are most likely still going to have interference problems resulting from echoes and multipath problems, despite the possible orthoganality of the codes.

Figure 18:
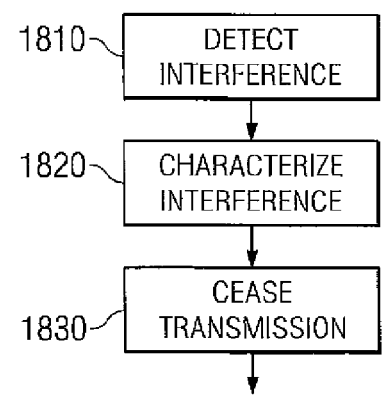
FIG. 18 is a flowchart depicting an embodiment of a method for mitigating interference between piconets.

A better solution to these interference problems is to reestablish multiple piconet channels by temporarily moving the piconets 140, 120 to different bands of the frequency spectrum. FIG. 18 is a flowchart of an embodiment of a method for mitigating interference between two or more piconets. Devices on a piconet may detect interference (STEP 1810) and characterize this interference (STEP 1820). Depending on the type of interference detected appropriate remedial action may be taken. If the interference originates from transmissions on a distinct piconet, the piconet may cease transmitting on certain bands until interference is no longer present (STEP 1830). It will be readily apparent to those of skill in the art that the method depicted in FIG. 18 may be used in conjunction with the codes described above to achieve an even greater effect.

During operation, device 122 on piconet 120 may detect a certain amount of interference (STEP 1810). This may be done in a variety of ways, many of which are well known in the art. One such method is the detection of a packet error rate. Many transmissions over wireless networks are accomplished using a from of packetized communication. These packets may have many formats, such as TCP/IP, X.25, Frame Relay, FDDI, IEEE 802.15.3a, etc. Piconet 120 may utilize these packets for transmission of data between two devices 122, 124. Since the reception and transmission of data between devices is the main purpose of most piconets, these packets are checked very closely. In fact, most packets include some type of error correction code to validate the sequence of bits which comprise most packets, such as FEC bits or the like.

Using these error correction codes and validation bits, device 122 receiving packets on piconet 120 can determine that the packet error rate has gone above a certain threshold, and at that point device 122 can make the determination that interference has been detected. Usually this determination is made by communication software resident on device 122. As is well known in the art, this determination may be made most efficiently at the medium access control (MAC) layer of the communication protocol utilized by this communications software.

Additionally, interference may also be detected (STEP 1810) by monitoring the bit error rate of received communication on piconet 120. Usually, on piconets, transmissions are made via a series of bits. As is well known in the art, the reception of these bits by device 122 may be assessed, and an error rate determined for the reception of bits. If this error rate exceeds a certain threshold, device 122 may determine that interference has been detected (STEP 1810). The bit error rate may be most efficiently determined by the physical components of device 122.

In many instances, after device 122 detects a certain threshold level of interference (STEP 1810), the MAC layer of the communication protocol resident on device 122 will attempt to mitigate this interference through the use of time division multiple access (TDMA). TDMA uses time division multiplexing to attempt to reduce the interference affecting device 122. However, in many cases utilizing TDMA does not alleviate the interference because TDMA relies solely on assigning time slots to different transmission streams, while in may cases the interference detected (STEP 1810) at device 122 is in the frequency domain, and is caused by the close physical proximity of another device 142 transmitting on another piconet 140.

After device 122 detects interference (STEP 1810), in many embodiments of the invention device 122 will then characterize this interference (STEP 1820). In order to mitigate the interference at device 122, the interference detected can be characterized to determine an appropriate remedy. In many cases this characterization may be done by the MAC layer of the communication protocol. The MAC layer may provide channel assessment commands in order to appropriately characterize the interference (STEP 1820). These channel assessment commands may analyze the quality and quantity of interference present on a particular band in order to make an accurate evaluation of the type of interference present on that band.

If it is determined that the interference detected (STEP 1810) by device 122 is a stationary, narrow band interference a simple solution may be devised, such as abandoning transmitting and receiving on that particular band or frequency. If, however, the interference is not confined to a narrow frequency band, or is somewhat variable in strength and frequency, another solution may be needed.

If device 122 detects interference (STEP 1810) and this interference is characterized (STEP 1820) as a shifting, variable interference, the piconet 120 may cease transmitting (STEP 1830) on certain bands in order to mitigate the interference between piconets 120, 140. Additionally, if abandoning the usage of certain bands by one piconet 120 is insufficient to remedy the interference problems, both piconets 140, 120 may abandon certain bands to further ameliorate the interference problem. In many embodiments of the invention, the frequency spectrum is partitioned into bands. The codes described above allow each piconet 140, 120 to utilize most if not all of the bands within the frequency spectrum. However, when interference is detected (STEP 1810) one piconet 140 may cease transmitting on one set of the bands and the other piconet 120 may utilize this same set of bands for its transmissions. Conversely, the other piconet 120 may cease transmitting on another set of bands while the first piconet 140 uses this set of bands for its transmissions. By keeping the sets of bands within the frequency spectrum substantially orthogonal, interference between the two piconets 140, 120 may be kept to a minimum. In some embodiments of the invention, devices 142, 122 on piconets 140, 120 may coordinate with one another and controllers 146, 126 of piconets 140, 120 in order to facilitate a graceful cessation of transmissions on orthogonal sets of bands.

Figure 20:
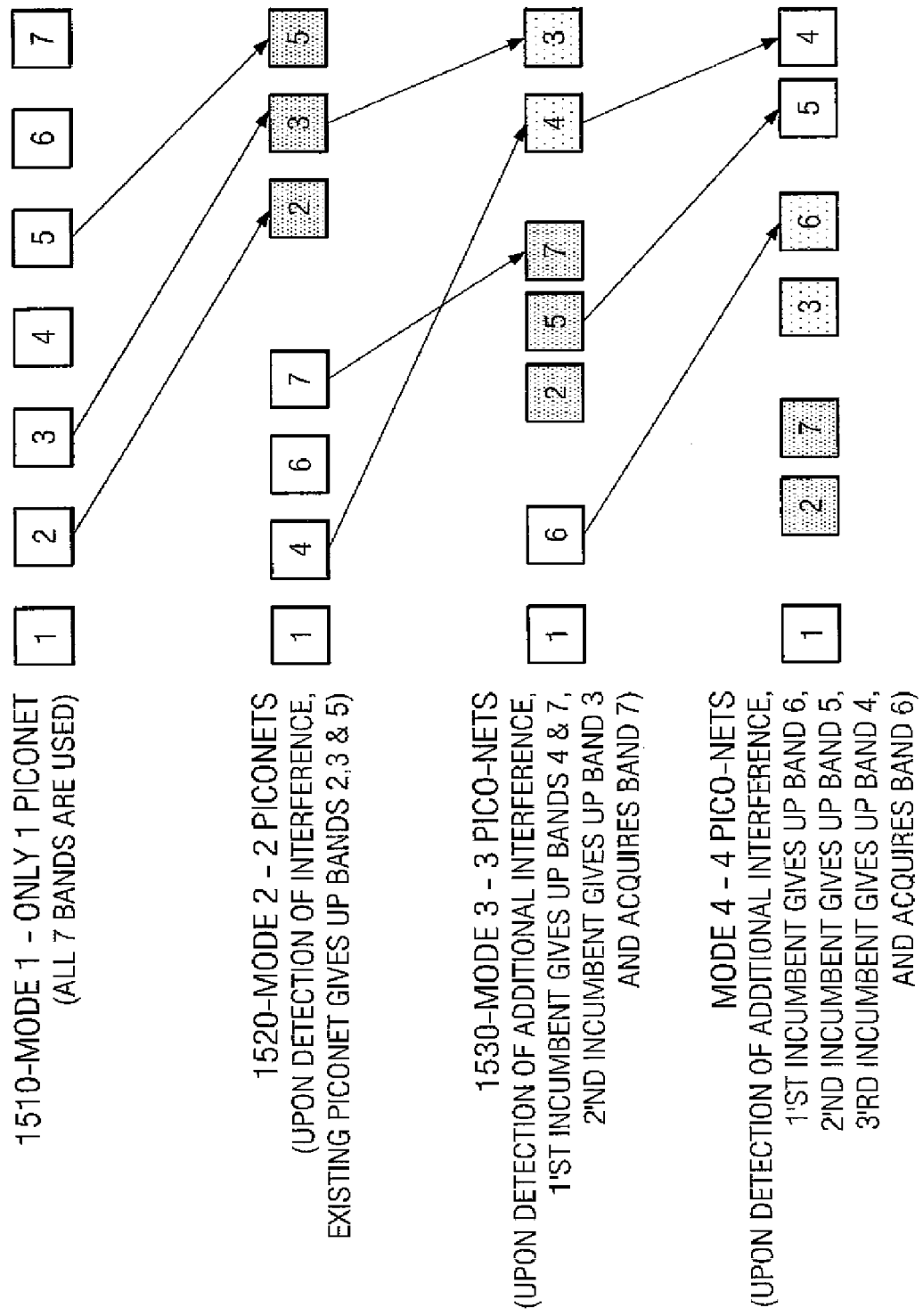
FIG. 20 is an illustration of a universal band sharing policy for piconets.

While it is desirable to have this coordination of frequency sharing be accomplished through actual message exchange, it is sometimes difficult to have devices 142, 122 within different piconets 140, 120 exchange messages, however briefly. An example of this situation may occur when dealing with secure piconets 140, 120, which will not talk to device 142, 122 that does not have a proper authentication code. In these situations, it is still possible to accomplish frequency sharing without explicate coordinating messaging. Turning briefly to FIG. 20, a solution to the problem of frequency sharing without communication between piconets 140, 120 is illustrated.

After detecting interference (STEP 1810) and characterizing this interference as originating with another piconet (STEP 1820) piconets 120, 140 may cease transmitting on certain bands (STEP 1830). This approach involve having a universally agreed to sharing policy, such that it will be possible to achieve sharing of the frequency spectrum without communication between the various piconets 140, 120 or piconet devices 142, 144, 146, 122, 124, 126.

In this particular example, the active frequency spectrum is separated into seven bands which are all being utilized by one piconet 120 (1510-MODE 1). Another piconet 140 may be established soon after and begin transmitting on all seven bands within the frequency spectrum in an initial attempt to coexist with the established piconet 120 through the use of the orthogonal codes described above. However, if the orthogonality is not adequate, both piconets 140, 120 will experience unacceptable packet error rates and piconet 120 (the previously established piconet) will know that because piconet 120 was previously established the protocol dictates that piconet 120 cease transmitting on bands 2, 3 and 5 of the frequency spectrum.

By the same token, a device 142 on piconet 140 may also detect interference. Device 142 may detect interference of its own accord, or device 122 on distinct piconet 120 may boost its transmission signal to cause device 142 on piconet 140 to perceive interference. When device 142 on newly arrived piconet 140 detects interference, the protocol may dictate that newly established piconet 140 cease transmitting on bands 1, 4, 6 and 7. Now incumbent piconet 120 may utilize bands 1, 4, 6 and 7 while newly arrived piconet 140 utilizes bands 2, 3 and 5 (1520—MODE 2). In this way interference between two piconets 140, 120 in close proximity may be mitigated. Both piconets 140, 120 may continue to monitor the bands that they have surrendered in order to detect lack of transmissions on these bands. For example, if piconet 120 ceases transmissions altogether, piconet 140 may be detect the lack of activity and begin transmitting on bands 1, 4, 6 and 7 once again.

The surrendering of these bands may be accomplished in a wide variety of different methods which will be readily apparent to those of skill in the art. One method may be device 122 on piconet 120 signaling controller 126 of piconet 120 that interference has been detected, the piconet controller 126 may in turn signal other devices 122, 124 on piconet 120 that they are to cease transmitting on certain bands of the frequency spectrum, and may utilize only certain other bands of the spectrum. Additionally, device 120 may cease transmitting on these bands unilaterally.

With two piconets 140, 120 sharing the frequency spectrum (1520—MODE 2), suppose a third piconet is now established. At that point, the two existing piconets 140, 120 experience an unacceptable decline in their packet error rate and devices on these piconets 140, 120 may detect interference from this third piconets. The existing piconets realize they are at MODE 2 (1520) in the universal sharing policy, and the policy may dictate that at this point the oldest existing piconet 120 surrender bands 4 and 7 leaving it with bands 1 and 6. The policy may further dictate that the other piconet 140 at mode 2 surrender band 3, and may now transmit on 2, 5 and 7, while the newly established piconet may utilize bands 4 and 3 (1530 MODE 3). The pre-agreed transition sequence assures that an acceptably equitable distribution is achieved and that the entire spectrum is effectively utilized by assigning substantially orthogonal bands of the frequency spectrum to different piconets 120, 140. It will be appreciated by those of ordinary skill in the art that many policies may be utilized for the assigning and distribution of bands of a frequency spectrum between piconets 120, 140, it will be further appreciated that these methodologies may be practiced with any different number of bands and piconets 120, 140, and may be utilized with the codes described above.

Figure 19:
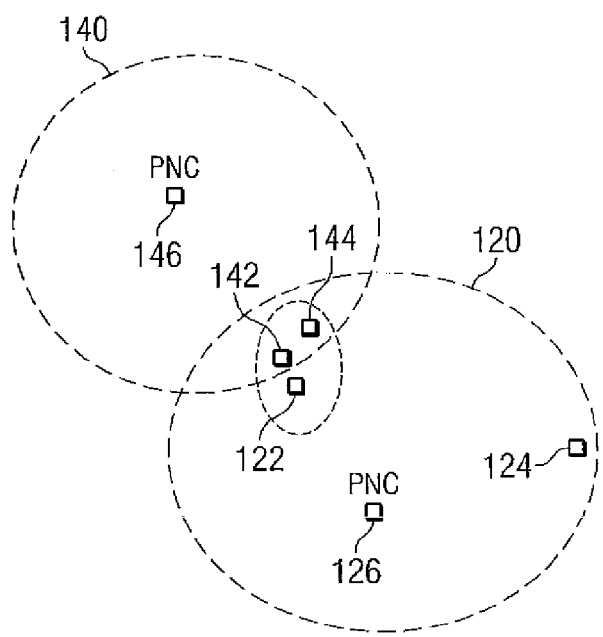
FIG. 19 is another physical representation of the overlapping geographical areas covered by two piconets

Though a universal sharing policy mitigates interference between piconets 120, 140 effectively, it is sometimes desirable to coordinate between piconets 120, 140 which bands will be allocated to each piconet and the associated administrative details. FIG. 19 illustrates just such a situation. In this case, two device 142, 144 on piconet 140 are in such close proximity to device 122 on piconet 120, that they are interfering with device 122. Device 122 may perceive this interference and begin to institute the universal sharing policy described above. However, it may be the case in this situation that devices 142, 144 are in such close proximity to one another during communication that they cannot detect interference from device 122 on piconet 120, even in the case where device 122 drastically increases the power of its signal.

Under these circumstances, device 122 on piconet 120 may communicate with any device 142, 144, 146 on piconet 140 in order to coordinate which sets of bands each piconet 140, 120 should cease using. In many circumstances the agreed upon protocol may mirror the universally agreed upon protocol discussed above, however, as one skilled in the art will appreciate any number of schemes may be concocted and agreed upon by the devices 142, 144, 146, 122, 124, 126 within piconets 140, 120. For example, if piconet 140 is experiencing low usage it may indicate it only requires usage of one band within the frequency spectrum and will cease transmitting on all other bands, conversely piconet 120 may utilize all other bands within the spectrum, but must abandoned one band for use by piconet 140.

In one embodiment of the invention extensions may be made to the MAC layer of the IEEE's "802.15.3a Wireless Personal Area Network" standard in order to facilitate this communication between piconets 102, 140. In particular, new MLME primitives may be added to allow communication between devices on distinct piconets. One example modifications that may be made to the MLME primitives are as follows:

802.15.3a MAC Supplements to Support Frequency Divisional Multiple Access
    Extensions to 820.15.3 Information Elements
        Dev Capability
    New Information Elements
        Bands Allowed
        Band Report
    Extensions to MLME Primitives
        MLME-SCAN.confirm
        MLME-Start.request
    Extensions to Support Piconet Parameter Change
        Piconet Parameter Change Information Element
        MLME-PICONET-PARM_CHANGE Primitive
    New MLME Primitives
        MLME-BAND-ASSESSMENT
        MLME-BAND-COORDINATION
        MLME-BAND-ALLOCATION
        MLME-REMOTE-BAND-ALLOCATION
        MLME-REMOTE-BAND-ASSESSMENT
        MLME-BAND-REPORT
        MLME-LINK-STATUS
    New MAC Command Frames
        Band Coordination
        Band Allocation
        Remote Band Assessment
        Link Status
    Extensions Information Element
        Dev Capabilities Field of Capability IE

| bits: b23-b16 | B15 | b14 | b13-b11 |
|---|---|---|---|
| Reserved | Will Band Allocate | Will Band Coordinate | Supported Bands[1] |

Dev Capabilities Field of Capability IE

| b10 | b9 | b8 | b7-b5 | b4-b0 |
|---|---|---|---|---|
| Listen to multicast | Listen to Source | Always awake | Preferred fragment size | Supported Modulations[2] |

[1]Follows Encoding of PHYPIB_BandsSupported
[2]Follows encoding of PHYPIB_ModulationVector New Information Elements
    Bands Allowed IE

| Octets: 2 | 1 | 1 |
|---|---|---|
| Bands Allowed | Length (= 2) | Element ID |

| Bands Allowed | | | | | | | |
|---|---|---|---|---|---|---|---|
| Bits: 15 | b14 | b13 | b12 | b11 | b10 | b9 | b8 |
| BAS | f(15) | f(14) | f(13) | f(12) | f(11) | f(10) | f(9) |
| b7 | b6 | b5 | b4 | b3 | b2 | b1 | b0 |
| f(7) | f(6) | f(5) | f(4) | f(3) | f(2) | f(1) | f(0) |

Band Assessment Status (BAS)

Set indicates all bands have been assessed
    Clear indicates all bands have not been assessed
        f(x) bit set means that band is allowed in the piconet
    If BAS set band is allowed based on assessment
    If BAS clear band is allowed based on PNC capability only
        Controlled by PNC based on assessment of band performance
        Required in every beacon Band Report

| Octets: 2 | ... | 2 | 2 | 1 | 1 |
|---|---|---|---|---|---|
| Band-n Report Info | ... | Band-2 Report Info | Band-1 Report Info | Length = (2 * n) | Element ID |

Band Report Info

| Octets:1 | 1 |
|---|---|
| CBAResult | CBABand |

Probe Rules
  PNC may request and may respond
  DEV may request of PNC and may respond to PNC
  DEV shall not request and shall not respond to DEV other than PNC Extensions to MLME Primitives
  MLME-SCAN.confirm
    Add BandsAllowed to the Piconet Description Set
  MLME-Start.request
    Add BandsAllowed Extension to Support Piconet Parameter Change
  Piconet Parameter Change Information Element
    Add change type encoding for Bands Allowed
    Allow super frame timing field to be interpreted as new Bands Allowed for this type

| Bits: 15 | b14 | b13 | b12 | b11 | b10 | b9 | b8 |
|---|---|---|---|---|---|---|---|
| BAS | f(15) | f(14) | f(13) | f(12) | f(11) | f(10) | f(9) |
| b7 | b6 | b5 | b4 | b3 | b2 | b1 | b0 |
| f(7) | f(6) | f(5) | f(4) | f(3) | f(2) | f(1) | f(0) |

Necessary only when Bands Allowed is changed because a band is being dis-allowed
  All DEVs automatically drop any dis-allowed bands from their data streams when change goes into effect—now band coordination is required for dropping dis-allowed bands
  MLME-PICONET-PARM-CHANGE Primitive
    Same as above MLME Primitives
  MLME-BAND-ASSESSMENT
    Request
      BandList—2 octets, bit set indicates request for assessment

| Bits: 15 | b14 | b13 | b12 | b11 | b10 | b9 | b8 |
|---|---|---|---|---|---|---|---|
| BAS | f(15) | f(14) | f(13) | f(12) | f(11) | f(10) | f(9) |
| b7 | b6 | b5 | b4 | b3 | b2 | b1 | b0 |
| f(7) | f(6) | f(5) | f(4) | f(3) | f(2) | f(1) | f(0) |

BandScanDuration
      1 octet, 0-65535 usec
    Confirmation
      NumberOfBands
        1 octet

| Octets: 1 | 1 | ... | 1 | 1 |
|---|---|---|---|---|
| Worst Band CBAR | Worst Band Index | | Best Band CBAR | Best Band Index |

BandRatingList
        variable octets
      ResultCode
        1 octet

| ResultCode | Indication |
|---|---|
| 0 | Success |
| 1 | Request Denied |
| 2 | Invalid Bands |
| 3 to 255 | Reserved |

MLME-BAND-COORDINATION
    Request
      TrgtID 1 octet
      BandList
        Same format as for MLME-BAND-ASSESSMENT, bit set is a request to signal on that band, if b3 is set b4 is ignored
      StreamList—n octets
    Indication
      OrigID—1 octet
      BandList—2 octets
      StreamList—n octets
    Response
      OrigID—1 octet
      ResultCode—1 octet
      BandList—2 octets
        If ResultCode is 0 or 4 BandList is ignored
        If ResultCode is 1, 2 or 3 BandList indicates unsupported, disallowed or unusable band(s)

| ResultCode | Indication |
|---|---|
| 0 | Band coordination successful |
| 1 | Band(s) not supported |
| 2 | Band(s) not allowed |
| 3 | Band unusable |
| 4 | Invalid stream(s) |
| 5 to 255 | Reserved |

Confirmation
      TrgtID—1 octet
      ResultCode—1 octet
      BandList—2 octets
      Origin DEV will transmit using the coordinated new bands in the superframe in which a reception of a MLME-BAND-COORDINATION.Confirmation with a successful ResultCode
      Origin DEV will immediately stop transmitting with a disallowed band, according to Bands Allowed Information Element in PNC beacon, regardless of any previously successful coordination
      Similarly, the Target DEV will immediately stop attempting to receive on any disallowed bands
  MLME-BAND-ALLOCATION
    Request
      BandList
        same format as for MLME-BAND-ASSESSMENT, bit set is a request to receive allocation of that band
      AllocationDuration—2 octets
        Number of superframes the Target will not use the band(s)
    Indication
      OrigID—1 octet
      BandList—2 octets
      AllocationDuration—2 octets
    Response
      OrigID—1 octet ResultCode—1 octet
Confirmation
ResultCode—1 octet
MLME-REMOTE-BAND-ALLOCATION
  Request
  TrgtID
  BandList
    same format as for MLME-BAND-ASSESSMENT, bit set is a request to receive allocation of that band
  AllocationDuration—2 octets
    Number of superframes the Target will not sue the band(s)
  Indication
  OrigID—1 octet
  TrgtID—1 octet
  BandList—2 octets
  AllocationDuration—2 octets
  Response
  OrigID—1 octet
  TrgtID—1 octet
  ResultCode—1 octet
  Confirmation
  TrgtID—1 octet
  ResultCode—1 octet

| ResultCode | Indication |
| --- | --- |
| 0 | Band Allocation Successful |
| 1 | Allocation duration denied |
| 2 | Band allocation denied |
| 3 | Invalid Request |

MLME-REMOTE-BAND-ASSESSMENT
  Request
  TrgtID
  BandList—2 octets, bit set indicates request for assessment

| Bits: 15 | b14 | b13 | b12 | b11 | b10 | b9 |
| --- | --- | --- | --- | --- | --- | --- |
| BAS | f(15) | f(14) | f(13) | f(12) | f(11) | f(10) |
| b7 | b6 | b5 | b4 | b3 | b2 | b1 | b0 |
| f(7) | f(6) | f(5) | f(4) | f(3) | f(2) | f(1) | f(0) |

RemoteScanTimeout
    1 octet, 0-65535 μsec
  Indication
  OrigID
  BandList
MLME-REMOTE-BAND-ASSESSMENT
  Response
  OrigID
  NumberofBands
  BandRatingList
  ResultCode

| Octets: 1 | 1 | ... | 1 | 1 |
| --- | --- | --- | --- | --- |
| Worst Band CBAR | Worst Band Index | | Best Band CBAR | Best Band Index |

Confirmation
  TrgtID
    1 octet
  NumberOfBands
    1 octet
  BandRatingList
    variable octets
  ResultCode
    1 octet

| ResultCode | Indication |
| --- | --- |
| 0 | Success |
| 1 | Request Denied |
| 2 | Invalid Bands |
| 3 to 255 | Reserved |

MLME-LINK-STATUS
  Request
  TrgtID
  LinkStatusTimeout, 0-65535 usec
  Indication
  OrigID\
  Response
  OrigID
  SampleWindowSize
  NumberOfBands
  ReceiverGain
  BandQualityList

| octets: 1 | ... | 1 |
| --- | --- | --- |
| Band n LQI | ... | Band 1 LQI |

Confirmation
  TrgtID
  SampleWindowSize, 0-65535 usec
  NumberOfBands
  BandQualityList
  ReceiverGain
  ResultCode
    Success, Timeout
MAC Command Frames
  Band Coordination request

| octets: n | 2 | 2 | 2 |
| --- | --- | --- | --- |
| StreamList | BandList | Length (=2 + n) | Command Type |

Same encoding as for MLME-BAND-COORDINATION.request
  Band coordination response

| octets: 2 | 1 | 2 | 2 |
| --- | --- | --- | --- |
| BandList | ResultCode | Length (=3) | Command Type |

Same encoding as for MLME-BAND-COORDINATION.response

Band allocation request

| octets: 2 | 2 | 2 | 2 |
|---|---|---|---|
| AllocationDuration | BandList | Length (=4) | Command Type |

Band allocation response

| octets: 1 | 2 | 2 |
|---|---|---|
| ResultCode | Length (=1) | Command Type |

Remote band allocation request

| octets: 2 | 2 | 1 | 2 | 2 |
|---|---|---|---|---|
| AllocationDuration | BandList | TrgtID | Length (=5) | Command Type |

Remote band allocation response

| octets: 1 | 1 | 2 | 2 |
|---|---|---|---|
| ResultCode | TrgtID | Length (=2) | Command Type |

Remote Band Assessment Request

| octets: 2 | 2 | 2 |
|---|---|---|
| BandList | Length (=2) | Command Type |

BandList

| Bits: 15 | b14 | b13 | b12 | b11 | b10 | b9 | b8 |
|---|---|---|---|---|---|---|---|
| BAS | f(15) | f(14) | f(13) | f(12) | f(11) | f(10) | f(9) |
| b7 | b6 | b5 | b4 | b3 | b2 | b1 | b0 |
| f(7) | f(6) | f(5) | f(4) | f(3) | f(2) | f(1) | f(0) | f(n) bit set requests assessment

Response

| octets: 2 * n | 1 | 2 | 2 |
|---|---|---|---|
| BandRatingList | Reason Code | Length (=1 + 2 * n) | Command Type |

BandRatingList

| Octets: 1 | 1 | ... | 1 | 1 |
|---|---|---|---|---|
| Worst Band CBAR | Worst Band Index | | Best Band CBAR | Best Band Index |

ResultCode

| Value | Indication |
|---|---|
| 0 | Success |
| 1 | Request Denied |
| 2 | Invalid Bands |
| 3 to 255 | Reserved |

Link Status
    Request

| octets: 1 | 2 | 2 |
|---|---|---|
| Stream index | Length (=1) | Command Type |

Response

| octets: 2 * n | 1 | 2 | 2 | 2 |
|---|---|---|---|---|
| Band Quality List | Receiver Gain | Sample Window Size | Length (=2 + 2 * n) | Command Type |

BandQualityList

| octets: 1 | ... | 1 |
|---|---|---|
| Band n LQI | ... | Band 1 LQI |

Figure 21:
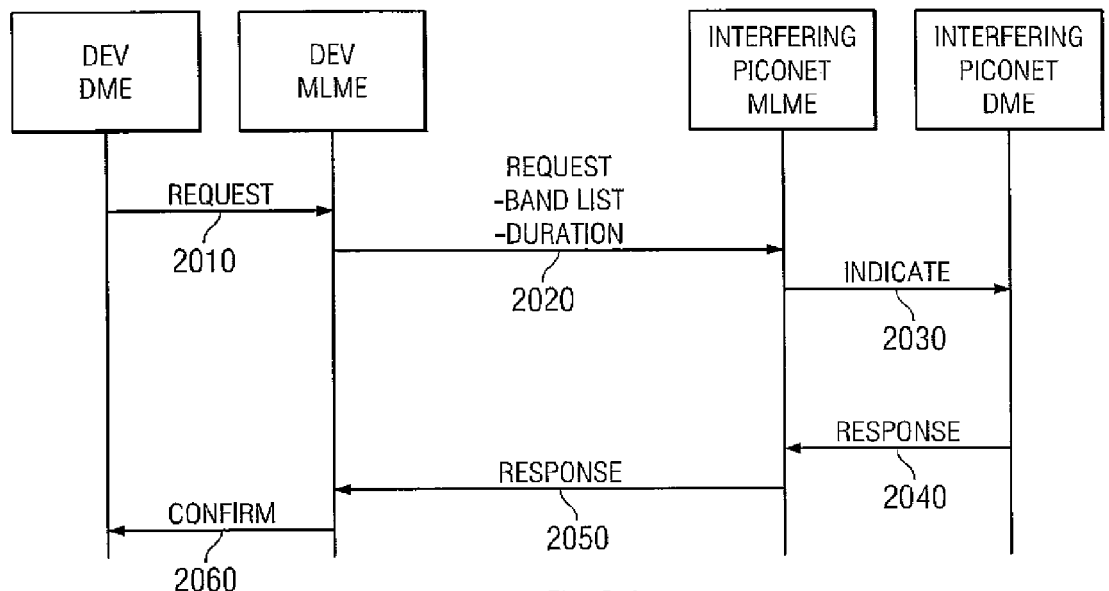
FIG. 21 is a message sequence chart depicting negotiated band allocation between a device and a piconet.
Figure 23:
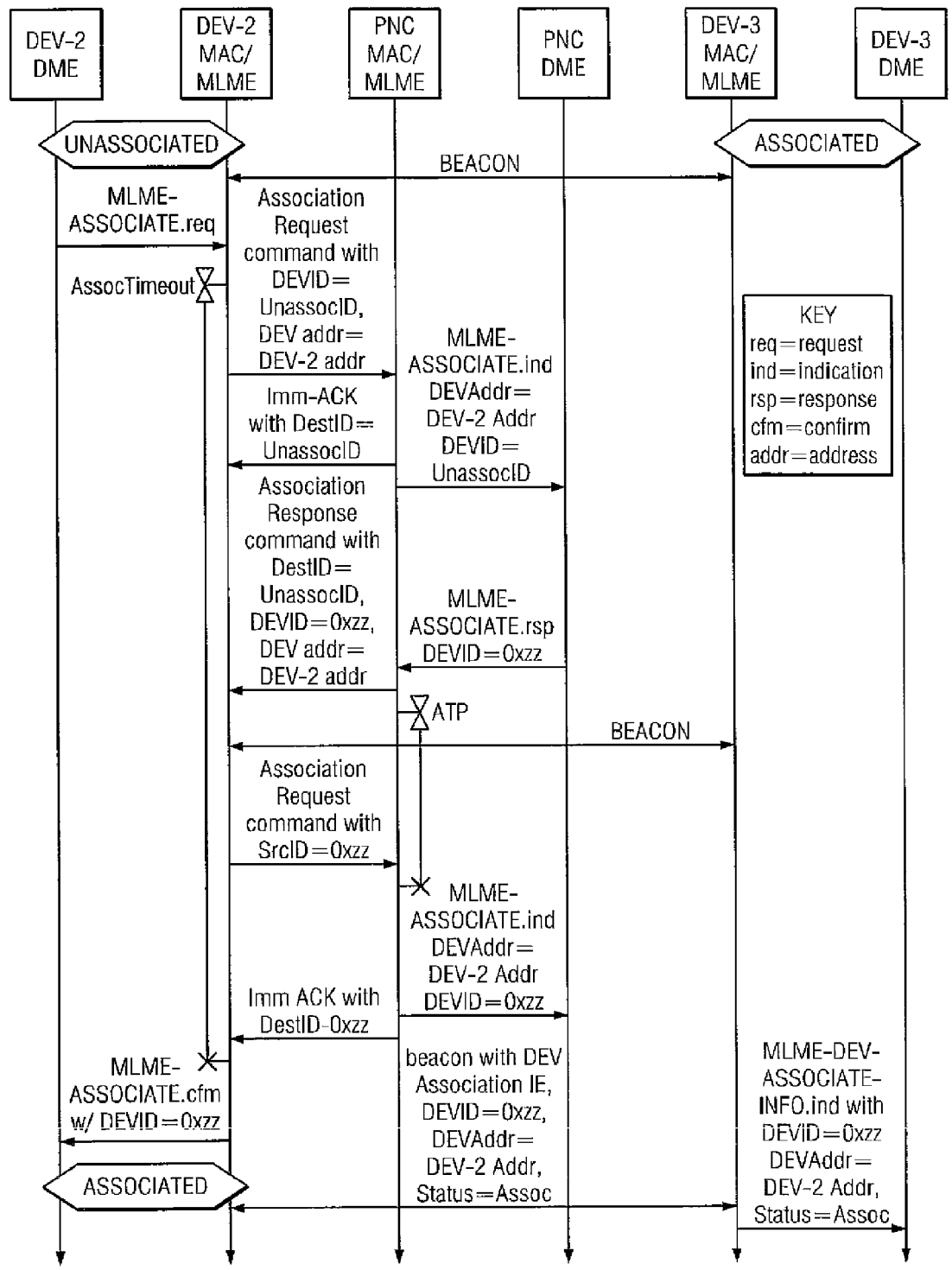
FIG. 23 is a message sequence chart depicting device initiated disassociation with a piconet.
Figure 24:
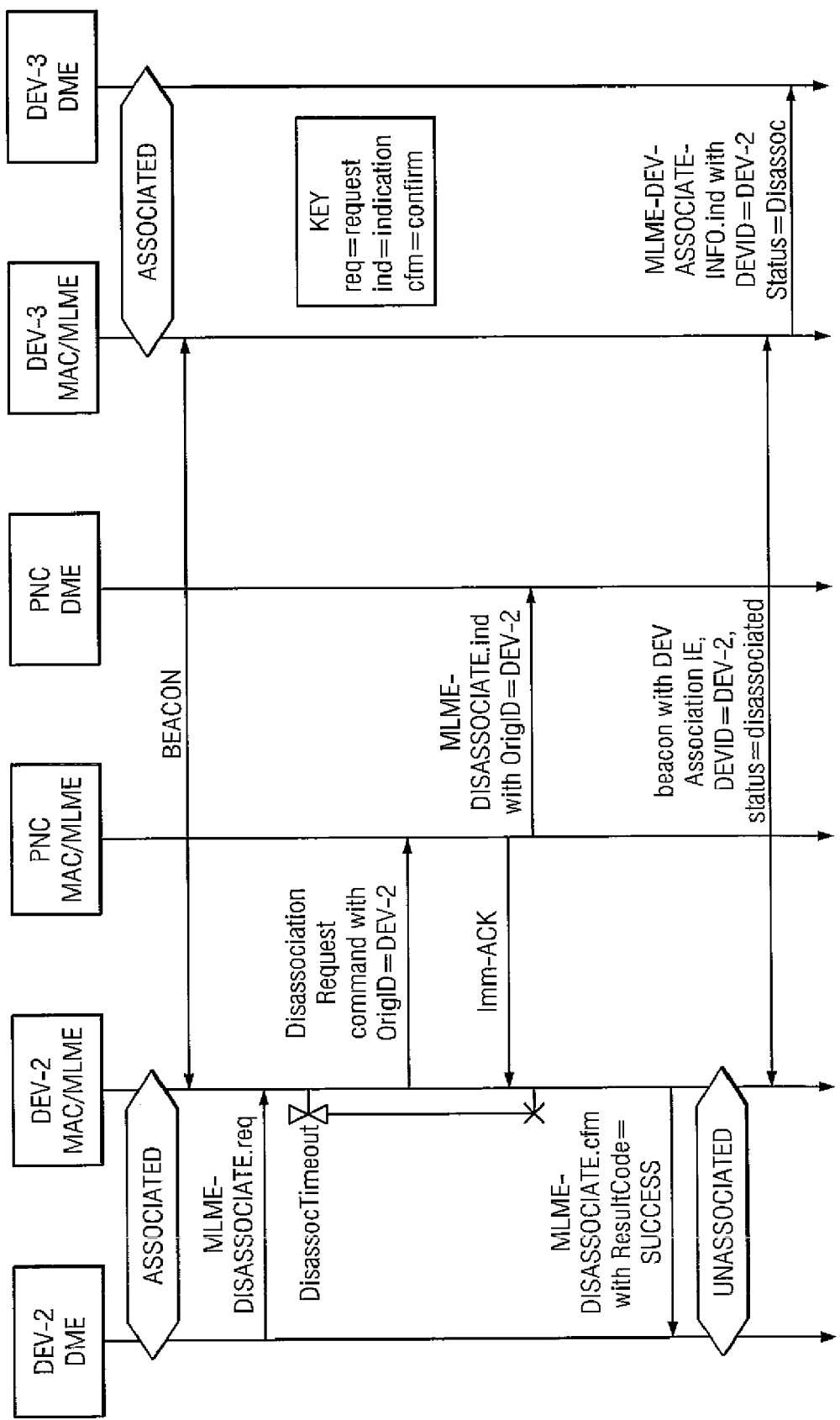
FIG. 24 is a message sequence chart depicting device initiated association with a piconet.

Support From Supplements
  Band Selection
    Based on capability and requirements
    Based on network interference as measured by PNC and/or all devices in the Network
    Based on coexistence as measured by PNC and/or all devices in the network
    Based on link performance between source and target DEVs
    Based on spectrum sharing Using these extensions a device 122 on piconet 120 may communicate with another piconet 140 in order to coordinate the division and usage of the bands of a frequency spectrum. The message sequence chart for this coordination process is depicted in FIG. 21. A device 122 may detect interference from another piconet 140 (STEP 1810). Device 122 can then disassociate from the piconet 120 to which it belongs. This disassociation process is depicted in FIG. 23. Device 122 may then associate with the interfering piconet 140. This association process is depicted in FIG. 24.

Returning now to FIG. 21, after associating with the interfering piconet 140, initiating device's DME layer sends a request to the device's MLME to request certain channels be freed up 2010 using MLME band allocation primitives. This request is then forwarded on to piconet 140 with which device 122 is now associated using MAC layer band allocation commands 2020. This request presents a list of bands which initiating device 122 wants freed, along with a time for which these bands should remain free. When piconet 140 receives this request the MLME layer of piconet controller 146 indicates to its DME that a request for certain bands has arrived using MLME band allocation primitives 2030.

In turn, piconet controller's 146 DME responds to the MLME using the same MLME band allocation primitives indicating that those bands are to be freed up for the duration requested 2040. The piconet controller 146 of interfering piconet 140 will then respond to device 122 using MAC band allocation commands indicating that device's 122 request has been granted 2050. Device's 122 MLME then confirms this grant to its DME using MLME band allocation primitives 2060.

Figure 22:
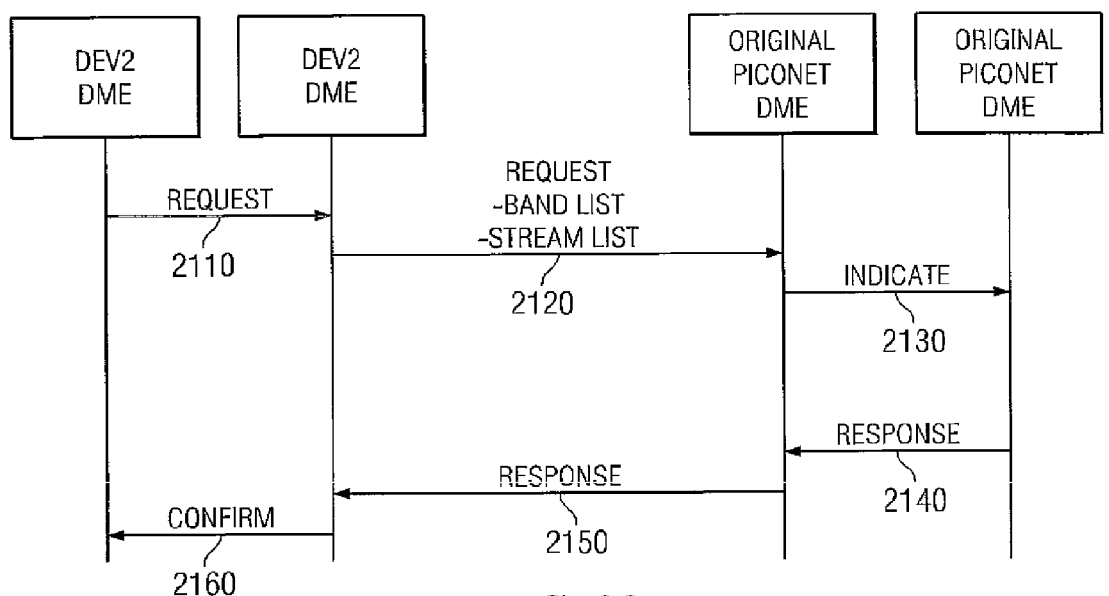
FIG. 22 is a message sequence chart depicting a device band coordinating within its piconet.

After this exchange between device 122 and interfering piconet 140, device 122 may disassociate from interfering piconet 140 and associate with its original piconet 120 (See FIGS. 22 and 23). Device 122 can then coordinate with piconet 120 to use the bands which interfering piconet 140 has relinquished. The message sequence chart for this coordination is depicted in FIG. 22.

Initiating device's DME layer sends a request to the device's MLME to request the use of certain channels agreed upon with interfering piconet 140 using MLME band allocation primitives 2110. This request is then forwarded on to the piconet 120 with which device 122 is now associated using MAC layer band allocation commands 2120. This request presents the list of bands which interfering piconet 140 has agreed to free, the associated stream list, along with a time for which these bands and streams should remain free. When piconet 120 receives this request the MLME layer of piconet controller 126 indicates to its DME that certain bands and streams have been freed for a certain duration using MLME band allocation primitives 2130.

In turn, piconet controller's 126 DME responds to the MLME using the same MLME band allocation primitives indicating that those bands are to be utilized for the duration indicated 2140. The piconet controller 126 of piconet 120 will then respond to device 122 using MAC band allocation commands indicating that device's 122 request has been received, acknowledged, and granted 2150. Device's 122 MLME then confirms this grant to its DME using MLME band allocation primitives 2160. After the expiration of the duration for which the bands were freed, interfering piconet 140 may return to transmitting on the granted bands. Piconet 120 can either wait to detect interference to coordinate with interfering piconet 140 again, or may preemptively enter into coordination with interfering piconet 140 before expiration of the duration for which the bands have been granted.

While a focus of the specification has been RF communications between devices using a piconet, the concepts are not limited to the embodiments described herein. The concepts may be applied to any communicating medium where communications are to be made between devices using electromagnetic radiation (including optical, ultraviolet, infrared, etc.) at discrete bands within a frequency spectrum.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:

1. A system comprising a set of piconets, wherein:
   each piconet in the set of piconets corresponds to a unique code compared to the other piconets in the set of piconets, wherein each unique code delineates a sequence of bands over a code length; and
   each piconet utilizes bands according to the corresponding unique code such that for a duration corresponding to the code length, the maximum number of dwell times that any two piconets utilize a band together during the duration is the code length divided by the number of bands.

2. The system of claim 1, wherein the code length is the number of dwell times in the longest non-repeating iteration of a sequence of bands delineated by a code.

3. The system of claim 1, wherein the set of piconets corresponds to a band group.

4. The system of claim 1, wherein the set of piconets corresponds to a unique set of bands and the sequences of bands each delineate a sequence of the unique set of bands.

5. The system of claim 1, wherein the code length is six.

6. The system of claim 1, wherein the number of bands is three.

7. A system comprising a set of band groups, wherein:
   each band group corresponds to a unique set of bands;
   each band group corresponds to a set of codes, wherein each code delineates a sequence of the corresponding unique bands over a code length, wherein the code length is the number of dwell times in the longest non-repeating iteration of a sequence of bands delineated by a code; and
   each band group corresponds to a set of piconets, wherein each piconet in the set of piconets corresponds to a unique code of the set of codes compared to the other piconets corresponding to the band group, said unique code being one of the codes in the set of codes corresponding to that band group.

8. The system of claim 7, wherein for the duration of any one code length the maximum number of dwell times that any two piconets in a band group utilize a band together is the code length divided by the number of bands in that band group.

9. The system of claim 8, wherein the code length is six.

10. The system of claim 8, wherein the number of bands is three.

11. A system comprising:
    a first piconet corresponding to a unique set of bands and a code, said code delineating a sequence of the unique set of bands over a code length; and
    a plurality of piconets corresponding to the unique set of bands wherein each piconet of the plurality of piconets further corresponds to a code, wherein each code delineates a sequence of the unique set of bands over the code length wherein for a duration corresponding to the code length, the maximum number of dwell times that any two piconets of the plurality of piconets or the first piconet utilize a band together is the code length divided by the number of bands.

12. The system of claim 11, wherein the code length is the number of dwell times in the longest non-repeating iteration of a sequence of bands delineated by a code.

13. The system of claim 11, wherein the piconet and the plurality of piconets correspond to a band group.

14. The system of claim 11, wherein the code length is six.

15. The system of claim 11, wherein the number of bands is three.

16. A method comprising:
providing a set of piconets, wherein each piconet in the set of piconets corresponds to a unique code compared to the other piconets in the set of piconets, wherein each unique code delineates a sequence of bands over a code length, and
wherein each piconet utilizes bands according to the corresponding unique code such that for a duration corresponding to the code length, the maximum number of dwell times that any two piconets utilize a band together during the duration is the code length divided by the number of bands.

17. The method of claim 16, wherein the code length is the number of dwell times in the longest non-repeating iteration of a sequence of bands delineated by a code.

18. The method of claim 16, wherein the set of piconets corresponds to a band group.

19. The method of claim 16, wherein the set of piconets corresponds to a unique set of bands and the sequences of bands each delineate a sequence of the unique set of bands.

20. The method of claim 16, wherein the code length is six.

21. The method of claim 16, wherein the number of bands is three.

22. A method comprising:
providing a set of band groups, wherein:
each band group corresponds to a unique set of bands;
each band group corresponds to a set of codes, wherein each code delineates a sequence of the corresponding unique bands over a code length, wherein the code length is the number of dwell times in the longest non-repeating iteration of a sequence of bands delineated by a code; and
each band group corresponds to a set of piconets, wherein each piconet in the set of piconets corresponds to a unique code of the set of codes compared to the other piconets corresponding to the band group, said unique code being one of the codes in the set of codes corresponding to that band group.

23. The method of claim 22, wherein for the duration of any one code length the maximum number of dwell times that any two piconets in a band group utilize a band together is the code length divided by the number of bands in that band group.

24. The method of claim 23, wherein the code length is six.

25. The method of claim 23, wherein the number of bands is three.

* * * * *